(12) United States Patent
Yamamoto et al.

(10) Patent No.: US 9,012,343 B2
(45) Date of Patent: Apr. 21, 2015

(54) GLASS FOR CHEMICAL STRENGTHENING

(71) Applicant: Asahi Glass Company, Limited, Chiyoda-ku (JP)

(72) Inventors: Hiroyuki Yamamoto, Haibara-gun (JP); Kazuhide Kuno, Haibara-gun (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 0 days.

(21) Appl. No.: 14/029,415

(22) Filed: Sep. 17, 2013

(65) Prior Publication Data
US 2014/0099501 A1    Apr. 10, 2014

Related U.S. Application Data

(63) Continuation of application No. PCT/JP2012/056645, filed on Mar. 15, 2012.

(30) Foreign Application Priority Data

Mar. 17, 2011  (JP) ................................. 2011-059661
Mar. 23, 2011  (JP) ................................. 2011-064617

(51) Int. Cl.
| | |
|---|---|
| C03C 3/083 | (2006.01) |
| C03C 3/087 | (2006.01) |
| C03C 3/085 | (2006.01) |
| C03C 3/091 | (2006.01) |
| C03C 3/095 | (2006.01) |
| C03C 21/00 | (2006.01) |
| C03C 3/093 | (2006.01) |
| C03C 4/02 | (2006.01) |

(52) U.S. Cl.
CPC ................ *C03C 3/083* (2013.01); *C03C 3/085* (2013.01); *C03C 3/087* (2013.01); *C03C 3/091* (2013.01); *C03C 3/095* (2013.01); *C03C 21/002* (2013.01); *C03C 3/093* (2013.01); *C03C 4/02* (2013.01)

(58) Field of Classification Search
CPC ........ C03C 3/091; C03C 3/093; C03C 3/083; C03C 3/085; C03C 3/087; C03C 3/078; C03C 4/02; C03C 4/085
USPC ........................ 501/66, 67, 68, 69, 70, 71, 72
See application file for complete search history.

(56) References Cited

U.S. PATENT DOCUMENTS

| | | | | |
|---|---|---|---|---|
| 5,268,335 | A | * | 12/1993 | Kerko et al. ..................... 501/66 |
| 5,422,755 | A | * | 6/1995 | Morgan ........................ 359/361 |
| 5,446,007 | A | * | 8/1995 | Krashkevich et al. .......... 501/64 |
| 6,268,696 | B1 | * | 7/2001 | Dolan et al. .................. 313/570 |
| 2009/0068404 | A1 | | 3/2009 | Akieda et al. |
| 2010/0190038 | A1 | * | 7/2010 | Osakabe et al. ........... 428/846.2 |
| 2011/0071012 | A1 | | 3/2011 | Kondo et al. |

FOREIGN PATENT DOCUMENTS

| | | |
|---|---|---|
| CN | 101689376 | 3/2010 |
| CN | 102020418 | 4/2011 |
| CN | 102290056 | 12/2011 |
| JP | 45-16112 | 6/1970 |
| JP | 10-001329 | 1/1998 |
| JP | 2009-061730 | 3/2009 |
| JP | 2009-099239 | 5/2009 |
| JP | 2011-084456 | 4/2011 |
| WO | 2009/041618 | 4/2009 |

OTHER PUBLICATIONS

U.S. Appl. No. 14/029,220, filed Sep. 17, 2013, Yamamoto, et al.
U.S. Appl. No. 13/938,822, filed Jul. 10, 2013, Yamamoto.
International Preliminary Report on Patentability and Written Opinion issued Sep. 26, 2013, in PCT/JP2012/056645 filed Mar. 15, 2012.
International Search Report issued Jun. 12, 2012 in PCT/JP2012/056645 filed Mar. 15, 2012.

* cited by examiner

*Primary Examiner* — Noah Wiese
(74) *Attorney, Agent, or Firm* — Oblon, McClelland, Maier & Neustadt, L.L.P.

(57) ABSTRACT

There is provided a glass for chemical strengthening having a black color tone and excelling in characteristics preferred for the purposes of housing or decoration of an electronic device, that is, bubble quality, strength, and light transmittance characteristics. A glass for chemical strengthening contains, in mole percentage based on following oxides, 55% to 80% of $SiO_2$, 3% to 16% of $Al_2O_3$, 0% to 12% of $B_2O_3$, 5% to 16% of $Na_2O$, 0% to 4% of $K_2O$, 0% to 15% of MgO, 0% to 3% of CaO, 0% to 18% of $\Sigma RO$ (where R represents Mg, Ca, Sr, Ba or Zn), 0% to 1% of $ZrO_2$, and 0.1% to 7% of a coloring component having at least one metal oxide selected from the group consisting of oxides of Co, Mn, Fe, Ni, Cu, Cr, V and Bi.

24 Claims, No Drawings

GLASS FOR CHEMICAL STRENGTHENING

CROSS-REFERENCE TO RELATED APPLICATIONS

This application is a continuation of prior International Application No. PCT/JP2012/056645 filed on Mar. 15, 2012, which is based upon and claims the benefit of priority from Japanese Patent Applications Nos. 2011-059661 filed on Mar. 17, 2011 and 2011-064617 filed on Mar. 23, 2011; the entire contents of all of which are incorporated herein by reference.

FIELD

The present invention relates to a glass for chemical strengthening used for a housing or decoration of an electronic device, for example, a communication device, an information device, and the like portably usable.

BACKGROUND

For a housing or decoration of an electronic device such as a portable phone, a material is appropriately selected from materials such as resin and metal and is used in consideration of various factors such as decorativeness, scratch resistance, workability, and cost.

In recent years, there have been attempts to use, as a material for housing, a glass that has not been used hitherto. According to Patent Reference 1 (JP-A 2009-61730 (KO-KAI)), by forming the housing itself from a glass in an electronic device such as a portable phone, it is possible to exhibit a unique decorative effect with transparency.

The housing or decoration of an electronic device for portable use such as a portable phone is required to have high strength in consideration of breakage by an impact of dropping when in use or contact scratches due to long-term use.

As a method to increase strength of the glass, a method of forming a compressive stress layer on a glass surface is generally known. Representative methods to form the compressive stress layer on a glass surface are an air-cooling tempering method (physical tempering method) and a chemical strengthening method. The air-cooling tempering method (physical tempering method) is performed by rapidly cooling such as air cooling a glass plate surface heated to a temperature near a softening point. On the other hand, the chemical strengthening method is to replace alkali metal ions (typically, Li ions, Na ions) having a smaller ion radius existing on the glass plate surface with alkali ions (typically, Na ions or K ions for Li ions, or K ions for Na ions) having a larger ion radius by ion exchange at temperatures lower than or equal to a glass transition point.

For example, in general, the glass for decoration as described above is often used with a thickness of 2 mm or less. When the air-cooling tempering method is employed for such a thin glass plate, it is difficult to assure a temperature difference between the surface and the inside, and hence it is difficult to form the compressive stress layer. Thus, in the glass after being tempered, the intended high strength characteristic cannot be obtained. Further, in the air-cooling tempering, due to variation in cooling temperature, there is a great concern that the flatness of the glass plate is impaired. The concern that the flatness is impaired is large in a thin glass plate in particular, and there is a possibility of impairing texture aimed by the present invention. From these points, it is preferred that the glass plate be tempered by the latter chemical strengthening method.

Further, in the housing or decoration of an electronic device such as a portable phone, a black glass is widely used which does not strongly emphasize the presence of the device itself, and by which firmness and luxuriousness can be obtained simultaneously.

It has been known that a glass can be chemical strengthened and exhibits a black color by Patent Reference 2 (JP-B 1970-16112 (KOKOKU)). The glass described in Patent Reference 2 is an aluminosilicate glass containing a high concentration of iron oxide.

SUMMARY

For example, in Patent Reference 2 it has been published that arsenous acid is used as a refining agent. The arsenous acid is an environment-affecting substance whose inverse effects to the environment are concerned not only in manufacturing processes but through the lifecycle of the product.

Accordingly, the inventors of the present invention heated and melted a glass material of the composition disclosed in the example of Patent Reference 2 without adding the arsenous acid, and found that only a glass can be obtained which hardly release bubbles, that is, has a poor refining ability, and hence has many remaining bubbles. Specifically, after a molten glass was casted in a block shape and was sliced into a plate shape and the surface thereof was polished, it was recognized that a large number of pockmark-like dents (hereinafter referred to as "open bubbles") formed by bubbles being cut in the glass is exposed on the polished surface.

For the purposes of housing or decoration of an electronic device as described above, a glass in which open bubbles exist cannot be used due to the demand for improving appearance quality, and thus causes a problem of largely reducing the production yield. There is also a concern that the open bubbles become an origin of crack and decrease the strength.

Moreover, the housing of an electronic device may be shaped and used not only in a flat plate shape but also in a concave or convex shape. Thus, a glass which is easily pressformed is demanded.

For the purpose of confirming that it has strength of a certain degree or more in quality management, a compressive stress value of the chemical strengthened glass is also measured.

However, when the glass has a black color, if it is measured with an existing surface stress meter, there is a problem that the measurement light is absorbed by the glass and the measurement of compressive stress value cannot be performed. Accordingly, it is demanded that even such a glass having a black color tone has transparency of a certain amount or more of light having a wavelength out of the visible range.

It is an object of the present invention to provide a glass for chemical strengthening excelling in characteristics preferred for the purposes of housing or decoration of an electronic device, that is, bubble quality, strength, and light transmission characteristics.

The present invention provides a glass for chemical strengthening containing, in mole percentage based on following oxides, 55% to 80% of $SiO_2$, 3% to 16% of $Al_2O_3$, 0% to 12% of $B_2O_3$, 5% to 16% of $Na_2O$, 0% to 4% of $K_2O$, 0% to 15% of MgO, 0% to 3% of CaO, 0% to 18% of $\Sigma RO$ (where R represents Mg, Ca, Sr, Ba or Zn), 0% to 1% of $ZrO_2$, and 0.1% to 7% of a coloring component having at least one metal oxide selected from the group consisting of oxides of Co, Mn, Fe, Ni, Cu, Cr, V and Bi.

(hereinafter, it may also be referred to as "a glass for chemical strengthening of the present invention").

Further, there is provided the glass for chemical strengthening of the present invention, wherein the coloring component in the glass is constituted of, in mole percentage based on oxides, 0.01% to 6% of $Fe_2O_3$, 0% to 6% of $Co_3O_4$, 0% to 6% of NiO, 0% to 6% of MnO, 0% to 6% of $Cr_2O_3$, and 0% to 6% of $V_2O_5$.

Further, the glass for chemical strengthening of the present invention is provided, containing 0.005% to 2% of a color correcting component having at least one metal oxide selected from the group consisting of oxides of Ti, Ce, Er, Nd and Se.

Further, the glass for chemical strengthening is provided containing, in mole percentage based on following oxides, 60% to 80% of $SiO_2$, 3% to 15% of $Al_2O_3$, 5% to 15% of $Na_2O$, 0% to 4% of $K_2O$, 0% to 15% of MgO, 0% to 3% of CaO, 0% to 18% of ΣRO (where R represents Mg, Ca, Sr, Ba or Zn), 0% to 1% of $ZrO_2$, 1.5% to 6% of $Fe_2O_3$, and 0.1% to 1% of $Co_3O_4$.

Further, the glass for chemical strengthening is provided containing, in mole percentage based on following oxides, 55% to 75% of $SiO_2$, 8% to 16% of $Al_2O_3$, 4% to 12% of $B_2O_3$, 7% to 16% of $Na_2O$, 0% to 4% of $K_2O$, 0% to 3% of MgO, 0% to 3% of CaO, 0% to 5% of ΣRO (where R represents Mg, Ca, Sr, Ba or Zn), 0% to 1% of $ZrO_2$, 1.5% to 6% of $Fe_2O_3$, and 0.1% to 1% of $Co_3O_4$.

Further, the glass for chemical strengthening of the present invention is provided, wherein a content ratio $Co_3O_4/Fe_2O_3$ is 0.01 to 0.5.

Further, the glass for chemical strengthening of the present invention is provided, wherein a content ratio $(SiO_2+Al_2O_3+B_2O_3)/(\Sigma R'_2O$ (where R' represents Na, K or Li$)+CaO+SrO+BaO+Fe_2O_3+Co_3O_4)$ is three or more.

Further, the glass for chemical strengthening of the present invention is provided, containing 0.005% to 0.5% of $SO_3$.

Further, the glass for chemical strengthening of the present invention is provided, containing 0.005% to 1% of $SnO_2$.

Further, the glass for chemical strengthening of the present invention is provided, wherein a minimum value of an absorption coefficient at wavelengths of 380 nm to 780 nm is 1 $mm^{-1}$ or more.

Further, the glass for chemical strengthening of the present invention is provided, wherein a relative value of an absorption coefficient at a wavelength of 550 nm to an absorption coefficient at a wavelength of 600 nm, as calculated from a spectral transmittance curve of the glass and a relative value of an absorption coefficient at a wavelength of 450 nm to an absorption coefficient at a wavelength of 600 nm, as calculated from a spectral transmittance curve of the glass are both within a range of 0.7 to 1.2.

Further, the glass for chemical strengthening of the present invention is provided, wherein absolute values of variations ΔT (550/600) and ΔT (450/600) calculated from relative values of the absorption coefficients as expressed by the following expressions (1) and (2) are 5% or less:

$$\Delta T(550/600)(\%)=[\{A(550/600)-B(550/600)\}/A(550/600)]\times 100 \quad (1); \text{ and}$$

$$\Delta T(450/600)(\%)=[\{A(450/600)-B(450/600)\}/A(450/600)]\times 100 \quad (2)$$

wherein the above expression (1), A(550/600) is a relative value of an absorption coefficient at a wavelength of 550 nm to an absorption coefficient at a wavelength of 600 nm, as calculated from a spectral transmittance curve of the glass after 100-hour irradiation with light of a 400 W high-pressure mercury lamp, and B(550/600) is a relative value of an absorption coefficient at a wavelength of 550 nm to an absorption coefficient at a wavelength of 600 nm, as calculated from a spectral transmittance curve of the glass before irradiation with the light; in the above expression (2), A(450/600) is a relative value of an absorption coefficient at a wavelength of 450 nm to an absorption coefficient at a wavelength of 600 nm, as calculated from a spectral transmittance curve of the glass after 100-hour irradiation with light of a 400 W high-pressure mercury lamp, and B(450/600) is a relative value of an absorption coefficient at a wavelength of 450 nm to an absorption coefficient at a wavelength of 600 nm, as calculated from a spectral transmittance curve of the glass before irradiation with the light.

Further, the glass for chemical strengthening of the present invention is provided, wherein when an indentation is formed by using a Vickers indenter in a mirror-finished surface of a glass plate having a thickness of 1 mm made of the glass for chemical strengthening, a load of the Vickers indenter that causes a crack occurrence rate to be 50% is 150 gf or more.

Further, the present invention provides a chemical strengthened glass obtained by chemical strengthening the above-described glass for chemical strengthening of the present invention, wherein a depth of a surface compressive stress layer formed in a surface of the chemical strengthened glass by the chemical strengthening is 30 μm or more, and a surface compressive stress of the surface compressive stress layer is 550 MPa or more.

DETAILED DESCRIPTION

Hereinafter, suitable embodiments of a glass for chemical strengthening of the present invention will be described. Note that the present invention is not limited to the following embodiments.

A glass for chemical strengthening according to the embodiments contains 0.1% to 7% of an above-described coloring component having at least one metal oxide selected from the group consisting of oxides of Co, Mn, Fe, Ni, Cu, Cr, V and Bi. Thus, it becomes possible to obtain a black base colored glass.

Further, a glass for housing purposes may be shaped and used, for example, not only in a flat plate shape but also in a concave or convex shape. In this case, a glass formed in a flat plate shape, a block shape, or the like is reheated and press-formed in a molten state, or a molten glass is poured into a press mold and press formed, to be formed in a desired shape.

When the glass is press-formed, it is preferred that the formation temperature of the glass be low during press formation. Generally, when the formation temperature of the glass during press formation is high, a superalloy or ceramics must be used for the mold, but they are poor in workability and also expensive, and hence are not preferable. When the formation temperature of the glass during press formation is high, the progress of degradation of the mold is also accelerated because the mold is used under high temperature. Further, since the glass is made into a soften state at high temperature, a large amount of energy is needed.

The glass for chemical strengthening according to the embodiments contains, in mole percentage based on following oxides, 0.1% to 7% of a coloring component having at least one metal oxide selected from the group consisting of oxides of Co, Mn, Fe, Ni, Cu, Cr, V and Bi, in the glass, and this allows to lower Tg (glass transition point), which is an indicator of the formation temperature of the glass during press formation. Thus, a glass excellent in press formability can be made, which is suitable for press forming into an appropriate shape such as a concave or convex shape.

In view of obtaining an excellent press formability as well as a desired light blocking effect in the black base color glass, the content of the coloring component having at least one metal oxide selected from the group consisting of oxides of Co, Mn, Fe, Ni, Cu, Cr, V and Bi, is preferably 0.5% to 6%, more preferably 1% to 5.5%.

As the coloring component having at least one metal oxide selected from the group consisting of oxides of Co, Mn, Fe, Ni, Cu, Cr, V and Bi, specifically, for example, $Co_3O_4$, MnO, $MnO_2$, $Fe_2O_3$, NiO, CuO, $Cu_2O$, $Cr_2O_3$, $V_2O_5$, $Bi_2O_3$ are used preferably.

Regarding these coloring components, it will suffice to contain one of them when the total content is 0.1% to 7%, but when each content is less than 0.01%, an effect as a coloring component cannot be obtained sufficiently. Preferably, its content is 0.1% or more, more preferably 0.2% or more. Further, when each content is more than 6%, the glass becomes unstable and devitrification occurs. Preferably, its content is 5% or less, more preferably, 4% or less.

It is preferred that the coloring component in the glass be constituted of, in mole percentage based on oxides, 0.01% to 6% of $Fe_2O_3$, 0% to 6% of $Co_3O_4$, 0% to 6% of NiO, 0% to 6% of MnO, 0% to 6% of $Cr_2O_3$, and 0% to 6% of $V_2O_5$. That is, with the $Fe_2O_3$ being an essential component, appropriate components selected from $Co_3O_4$, NiO, MnO, $Cr_2O_3$ and $V_2O_5$ may be combined and used. When the content of $Fe_2O_3$ is less than 0.01%, it is possible that a desired light blocking effect cannot be obtained. On the other hand, when the content of $Fe_2O_3$ is more than 6%, the glass may become unstable. Further, regarding the other components, namely, $Co_3O_4$, NiO, MnO, $Cr_2O_3$ and $V_2O_5$, when each content is more than 6%, the glass may become unstable.

Note that in this specification, the contents of coloring component and color correcting component indicate a converted content given that each component existing in the glass exists as the represented oxide. For example, "containing 0.01% to 6% of $Fe_2O_3$" means an Fe content given that Fe existing in the glass exists entirely in the form of $Fe_2O_3$, that is, the $Fe_2O_3$-converted content of Fe is 0.01% to 6%.

For the glass for chemical strengthening according to the embodiments, it is possible to preferably use as the coloring component, for example: (i) a combination of $Fe_2O_3$ and at least one component selected from the group consisting of $Co_3O_4$, MnO, $MnO_2$, CuO, $Cu_2O$, $Cr_2O_3$, $V_2O_5$ and $Bi_2O_3$, (ii) a combination of $Fe_2O_3$ and at least one component selected from the group consisting of MnO, $MnO_2$, NiO, CuO, $Cu_2O$, $Cr_2O_3$, $V_2O_5$ and $Bi_2O_3$, and (iii) a combination of $Co_3O_4$ and at least one component selected from the group consisting of MnO, $MnO_2$, NiO, CuO, $Cu_2O$, $Cr_2O_3$, $V_2O_5$ and $Bi_2O_3$.

To make the absorption coefficients at wavelengths of 380 nm to 780 nm be 1 $mm^{-1}$ or more, it is preferred to make the absorption coefficients for light at these wavelengths be averagely high by combining plural coloring components. For example, in glasses for chemical strengthening of a first embodiment and a second embodiment, which will be described in detail below, by containing a combination of 1.5% to 6% of $Fe_2O_3$ and 0.1% to 1% of $Co_3O_4$ as coloring components in the glass, a glass can be made which sufficiently absorbs light in the visible range of wavelengths from 380 nm to 780 nm and meanwhile averagely absorbs light in the visible range. That is, when it is attempted to obtain a glass exhibiting a black color, depending on the type and blending amount of coloring components, a black color exhibiting brown or blue may be generated due to the existence of a wavelength range with a low absorption characteristic in the visible range of wavelengths from 380 nm to 780 nm. In this respect, having the above-described coloring components allows to represent what is called a jet-black color.

As ones by which such an absorption characteristic can be obtained, combinations of blending amounts of coloring components other than the above-described ones include a combination of 0.01% to 4% of $Fe_2O_3$, 0.2% to 3% of $Co_3O_4$, and 1.5% to 6% of NiO, a combination of 1.5% to 6% of $Fe_2O_3$ and 0.1% to 1% of NiO, a combination of 0.01% to 4% of $Fe_2O_3$, 0.05% to 2% of $Co_3O_4$, 0.05% to 2% of NiO, and 0.05% to 2% of $Cr_2O_3$, and a combination of 0.01% to 4% of $Fe_2O_3$, 0.05% to 2% of $Co_3O_4$, 0.05% to 2% of NiO, and 0.05% to 2% of MnO.

Further, by combining coloring components in the glass, a glass can be made that has transparency of certain wavelengths of ultraviolet light, infrared light, or the like while sufficiently absorbing light in the visible range at wavelengths of 380 nm to 780 nm. For example, a glass containing the above-described combination of $Fe_2O_3$, $Co_3O_4$, NiO, MnO, $Cr_2O_3$, $V_2O_5$ as coloring components can have transparency of ultraviolet light at wavelengths of 300 nm to 380 nm as well as infrared light at wavelengths of 800 nm to 950 nm. Further, a glass containing the above-described combination of $Fe_2O_3$ and $Co_3O_4$ as coloring components can have transparency of infrared light at wavelengths of 800 nm to 950 nm. For example, the infrared light at wavelengths of 800 nm to 950 nm is utilized in an infrared communication device used in data communication of a portable phone or a portable game device. Accordingly, giving an infrared light transmitting characteristic to a glass by blending the above-described combination of coloring components allows that, when the glass is applied to housing purposes for example, it can be applied without providing an opening for the infrared light communication device in the housing.

It is preferred that the glass for chemical strengthening according to the embodiments contain, as a color correcting component, 0.005% to 2% of at least one metal oxide selected from the group consisting of oxides of Ti, Ce, Er, Nd and Se.

As the color correcting component having at least one metal oxide selected from the group consisting of oxides of Ti, Ce, Er, Nd and Se, specifically, for example $TiO_2$, $CeO_2$, $Er_2O_3$, $Nd_2O_3$ and $SeO_2$ are used preferably.

By containing, as the color correcting component, 0.005% or more in total of metal oxides, i.e. oxides of Ti, Ce, Er, Nd and Se, the difference in absorption characteristic of light within the wavelength range of the visible range can be reduced, and a glass having a black color tone of what is called jet black which do not exhibit brown or blue color can be obtained. Further, by making the above-described content of color correcting components be 2% or less, it is possible to suppress the glass from becoming unstable which causes devitrification. The above-described total content of color correcting components is more preferably 0.01% to 1.8%, furthermore preferably 0.1% to 1.5%.

As the glass for chemical strengthening according to the embodiments, one can be exemplified which contains, together with the above-described coloring components, in mole percentage based on following oxides, 55% to 80% of $SiO_2$, 3% to 16% of $Al_2O_3$, 0% to 12% of $B_2O_3$, 5% to 16% of $Na_2O$, 0% to 4% of $K_2O$, 0% to 15% of MgO, 0% to 3% of CaO, 0% to 18% of ΣRO (where R represents Mg, Ca, Sr, Ba or Zn), and 0% to 1% of $ZrO_2$. Note that ΣRO means the sum of all the RO components i.e. "MgO+CaO+SrO+BaO+ZnO".

Hereinafter, compositions of glasses other than coloring components of the glass for chemical strengthening according to the embodiments will be described using a content expressed in mole percentage unless otherwise stated.

$SiO_2$ is a component that forms a network former of the glass and hence is essential. When its content is less than 55%, stability as a glass decreases, or weather resistance decreases. Preferably, its content is 60% or more. More preferably, its content is 65% or more. When the content of $SiO_2$ is more than 80%, viscosity of the glass increases, and meltability of the glass decreases significantly. Preferably, its content is 75% or less, typically 70% or less.

$Al_2O_3$ is a component that improves weather resistance and chemical strengthening characteristic of the glass and is essential. When its content is less than 3%, the weather resistance decreases. Preferably, its content is 4% or more, typically 5% or more.

When the content of $Al_2O_3$ is more than 16%, viscosity of the glass becomes high and uniform melting becomes difficult. Preferably, its content is 14% or less, typically 12% or less.

$B_2O_3$ is a component that improves weather resistance of the glass, and is not essential but can be contained as necessary. When $B_2O_3$ is contained, if its content is less than 4%, it is possible that a significant effect cannot be obtained regarding improvement of the weather resistance. Preferably, its content is 5% or more, typically 6% or more.

When the content of $B_2O_3$ is more than 12%, it is possible that striae due to volatilization occur and the yield decreases. Preferably, its content is 11% or less, typically 10% or less.

$Na_2O$ is a component that improves meltability of the glass, and is essential because it causes a surface compressive stress layer to be formed by ion exchange. When its content is less than 5%, the meltability is poor and it is also difficult to form a desired surface compressive stress layer by ion exchange. Preferably, its content is 7% or more, typically 8% or more.

The weather resistance decreases when the content of $Na_2O$ is more than 16%. Preferably, its content is 15% or less, typically 14% or less.

$K_2O$ is a component that improves meltability of the glass, and has an operation to increase ion exchange speed in chemical strengthening. Thus, this component is not essential but is preferred to be contained. When $K_2O$ is contained, if its content is less than 0.01%, it is possible that a significant effect cannot be obtained regarding improvement of meltability, or that a significant effect cannot be obtained regarding ion exchange speed improvement. Typically, its content is 0.3% or more. When the content of $K_2O$ is more than 4%, weather resistance decreases. Preferably, its content is 3% or less, typically 2% or less.

MgO is a component that improves meltability of the glass, and is not essential but can be contained as necessary. When MgO is contained, if its content is less than 3%, it is possible that a significant effect cannot be obtained regarding improvement of meltability. Typically, its content is 4% or more. When the content of MgO is more than 15%, weather resistance decreases. Preferably, its content is 13% or less, typically 12% or less.

CaO is a component that improves meltability of the glass and is not essential but can be contained as necessary. When CaO is contained, if its content is less than 0.01%, a significant effect cannot be obtained regarding improvement of meltability. Typically, its content is 0.1% or more. When the content of CaO is more than 3%, the chemical strengthening characteristic decreases. Preferably, its content is 1% or less, typically 0.5% or less. Practically, it is preferred not to be contained.

RO (where R represents Mg, Ca, Sr, Ba or Zn) is a component that improves meltability of the glass and is not essential, but any one or more of them can be contained as necessary. In this case, it is possible that the meltability decreases when the total content of RO (where R represents Mg, Ca, Sr, Ba or Zn), i.e. the content of $\Sigma RO$, is less than 1%. Preferably, its content is 3% or more, typically 5% or more. When the content of $\Sigma RO$ (where R represents Mg, Ca, Sr, Ba or Zn) is more than 18%, weather resistance decreases. Preferably, its content is 15% or less, more preferably 13% or less, typically 11% or less.

$ZrO_2$ is a component that increases ion exchange speed and is not essential, but may be contained within the range 1% or less. When the content of $ZrO_2$ is more than 1%, meltability worsens and there may be cases where it remains as a non-melted matter in the glass. Typically, $ZrO_2$ is not contained.

There are two embodiments (first embodiment and second embodiment) which will be described below as preferred embodiments for the glass for chemical strengthening according to the embodiments.

A glass for chemical strengthening of a first embodiment will be described. Regarding the glass for chemical strengthening of the first embodiment below, the composition will be described using a content expressed in mole percentage unless otherwise particularly stated.

The glass for chemical strengthening according to the first embodiment contains, in mole percentage based on following oxides, 60% to 80% of $SiO_2$, 3% to 15% of $Al_2O_3$, 5% to 15% of $Na_2O$, 0% to 4% of $K_2O$, 0% to 15% of MgO, 0% to 3% of CaO, 0% to 18% of $\Sigma RO$ (where R represents Mg, Ca, Sr, Ba or Zn), 0% to 1% of $ZrO_2$, 1.5% to 6% of $Fe_2O_3$, and 0.1% to 1% of $Co_3O_4$.

$SiO_2$ is a component that forms a network former of the glass and hence is essential. When its content is less than 60%, stability as a glass decreases, or weather resistance decreases. Preferably, its content is 61% or more. More preferably, its content is 65% or more. When the content of $SiO_2$ is more than 80%, viscosity of the glass increases, and meltability decreases significantly. Preferably, its content is 75% or less, typically 70% or less.

$Al_2O_3$ is a component that improves weather resistance and chemical strengthening characteristic of the glass and is essential. When its content is less than 3%, the weather resistance decreases. Preferably, its content is 4% or more, typically 5% or more. When the content of $Al_2O_3$ is more than 15%, viscosity of the glass becomes high and uniform melting becomes difficult. Preferably, its content is 14% or less, typically 12% or less.

$Na_2O$ is a component that improves meltability of the glass, and is essential because it causes a surface compressive stress layer to be formed by ion exchange. When its content is less than 5%, the meltability is poor and it is also difficult to form a desired surface compressive stress layer by ion exchange. Preferably, its content is 7% or more, typically 8% or more. When the content of $Na_2O$ is more than 15%, weather resistance decreases. Preferably, its content is 14% or less, typically 12% or less.

$K_2O$ is a component that improves meltability, and has an operation to increase ion exchange speed in chemical strengthening. Thus, this component is not essential but is preferred to be contained. When $K_2O$ is contained, if its content is less than 0.01%, it is possible that a significant effect cannot be obtained regarding improvement of meltability, or that a significant effect cannot be obtained regarding ion exchange speed improvement. Typically, its content is 0.3% or more. When the content of $K_2O$ is more than 4%, weather resistance decreases. Preferably, its content is 3% or less, typically 2% or less.

MgO is a component that improves meltability, and is not essential but can be contained as necessary. When MgO is contained, if its content is less than 3%, it is possible that a significant effect cannot be obtained regarding improvement of meltability. Typically, its content is 4% or more. When the content of MgO is more than 15%, weather resistance decreases. Preferably, its content is 13% or less, typically 12% or less.

CaO is a component that improves meltability and can be contained as necessary. When CaO is contained, if its content is less than 0.01%, a significant effect cannot be obtained regarding improvement of meltability. Typically, its content is 0.1% or more. When the content of CaO is more than 3%, the chemical strengthening characteristic decreases. Preferably, its content is 1% or less, typically 0.5% or less. Practically, it is preferred not to be contained.

RO (where R represents Mg, Ca, Sr, Ba or Zn) is a component that improves meltability and is not essential, but any one or more of them can be contained as necessary. In this case, it is possible that the meltability decreases when the total content of RO (where R represents Mg, Ca, Sr, Ba or Zn), i.e. the content of $\Sigma RO$, is less than 1%. Preferably, its content is 3% or more, typically 5% or more. When the content of $\Sigma RO$ (where R represents Mg, Ca, Sr, Ba or Zn) is more than 18%, weather resistance decreases. Preferably, its content is 15% or less, more preferably 13% or less, typically 11% or less.

$ZrO_2$ is a component that increases ion exchange speed and is not essential, but may be contained within the range 1% or less. When the content of $ZrO_2$ is more than 1%, meltability worsens and there may be cases where it remains as a non-melted matter in the glass. Typically, $ZrO_2$ is not contained.

$Fe_2O_3$ is an essential component for coloring a glass with a deep color. When the total iron content represented by $Fe_2O_3$ is less than 1.5%, a desired black glass cannot be obtained. Preferably, its content is 2% or more, more preferably 3% or more. When the content of $Fe_2O_3$ is more than 6%, the glass becomes unstable and devitrification occurs. Preferably, its content is 5% or less, more preferably 4% or less.

It is preferred that, among the total iron, the ratio of divalent iron content (iron redox) converted by $Fe_2O_3$ be 10% to 50%, particularly 15% to 40%. Most preferably, the iron redox is 20% to 30%. When the iron redox is less than 10%, decomposition of $SO_3$ does not proceed when $SO_3$ is contained, and it is possible that an expected refining effect cannot be obtained. When the iron redox is more than 50%, decomposition of $SO_3$ proceeds too much before refining, and it is possible that the expected refining effect cannot be obtained, or that it becomes a source of bubbles and increases the number of bubbles.

In this specification, the content of the total iron converted into $Fe_2O_3$ represents the content of $Fe_2O_3$. Regarding the iron redox, the ratio of bivalent iron converted into $Fe_2O_3$ among the total iron converted into $Fe_2O_3$ by a Moessbauer spectroscopy can be represented by percent. Specifically, evaluation is performed with a transmission optical system in which a radiation source ($^{57}Co$), a glass sample (a glass flat plate having a thickness of 3 mm to 7 mm which is cut from the above-described glass block, grinded, and mirror polished), and a detector (45431 made by LND, Inc.) are disposed on a straight line. The radiation source is moved with respect to an axial direction of the optical system, so as to cause an energy change of γ ray by a Doppler effect. Then, a Moessbauer absorption spectrum obtained at room temperature is used to calculate the ratio of bivalent Fe to total iron and the ratio of trivalent Fe to total iron, and the ratio of bivalent Fe to total iron is taken as the iron redox.

$Co_3O_4$ is a coloring component, and is an essential component for exhibiting a refining effect while coexisting with iron. Specifically, $O_2$ bubbles discharged when trivalent iron becomes bivalent iron in a high-temperature state are absorbed when cobalt is oxidized. Consequently the $O_2$ bubbles are reduced, and thus the refining effect is obtained.

Moreover, $Co_3O_4$ is a component that further increases the refining operation when being allowed to coexist with $SO_3$. Specifically, for example, when a sodium sulfate ($Na_2SO_4$) is used as a refining agent, refining from the glass improves by allowing the reaction $SO_3 \rightarrow SO_2 + \frac{1}{2}O_2$ to proceed, and thus the oxygen partial pressure in the glass is preferred to be low. By co-adding cobalt to a glass containing iron, release of oxygen occurring due to reduction of iron can be suppressed by oxidation of cobalt, and thus decomposition of $SO_3$ is accelerated. Thus, it is possible to produce a glass with a small bubble defect.

Further, in a glass containing a relatively large amount of alkali metal for chemical strengthening, basicity of the glass increases, $SO_3$ does not decompose easily, and the refining effect decreases. In this manner, in the glass for chemical strengthening in which $SO_3$ does not decompose easily and which contains iron, cobalt accelerates decomposition of $SO_3$, and hence is effective in particular for acceleration of a refining effect. In order for such a refining operation to occur, the content of $Co_3O_4$ is 0.1% or more, preferably 0.2% or more, typically 0.3% or more. When its content is more than 1%, the glass becomes unstable and devitrification occurs. Preferably, its content is 0.8% or less, more preferably 0.6% or less.

When a ratio of a content of $Co_3O_4$ and a content of $Fe_2O_3$ i.e. a content ratio $Co_3O_4/Fe_2O_3$, is less than 0.01, it is possible that the above-described refining effect cannot be obtained. Preferably, the content ratio $Co_3O_4/Fe_2O_3$ is 0.05 or more, typically 0.1 or more. When the content ratio $Co_3O_4/Fe_2O_3$ is more than 0.5, it inversely becomes a source of bubbles, and it is possible that melting down of the glass becomes slow or the number of bubbles increases. Thus, a countermeasure such as using a separate refining agent, or the like needs to be taken. Preferably, the content ratio $Co_3O_4/Fe_2O_3$ is 0.3 or less, more preferably 0.2 or less.

NiO is a coloring component for coloring a glass with a desired black color, and is a component which is preferred to be used in the glass for chemical strengthening according to the embodiments. When NiO is contained, the effect as a coloring component cannot be obtained sufficiently if its content is less than 0.05%. Preferably, its content is 0.1% or more, more preferably 0.2% or more. When the content of NiO is more than 6%, brightness of the color tone of the glass becomes excessively high, and a desired black color tone cannot be obtained. Further, the glass becomes unstable and devitrification occurs. Preferably, its content is 5% or less, more preferably 4% or less.

MnO, $MnO_2$, CuO, $Cu_2O$, $Cr_2O_3$, $V_2O_5$, and $Bi_2O_3$ are coloring components and are not essential, but at least one of these color components can be contained as necessary. When these coloring components are contained, the effect as a coloring component cannot be obtained sufficiently if each content is less than 0.01%. Preferably, its content is 0.1% or more, more preferably 0.2% or more. Further, when each content is more than 6%, the glass becomes unstable and devitrification occurs. Preferably, its content is 5% or less, more preferably, 4% or less.

A content ratio $(SiO_2+Al_2O_3+B_2O_3)/(\Sigma R'_2O$ (where R' represents Na, K or Li)$+CaO+SrO+BaO+Fe_2O_3+Co_3O_4)$ means a ratio of a total content of reticulate oxides forming the network of the glass i.e. $SiO_2$, $Al_2O_3$, and $B_2O_3$, and a total content of main modified oxides i.e. $Na_2O$, $K_2O$, $Li_2O$, CaO, SrO, BaO, $Fe_2O_3$, and $Co_3O_4$. Note that $\Sigma R'_2O$ represents the sum of all the R'$_2$O components i.e. "Na$_2$O+K$_2$O+Li$_2$O". When this ratio is less than 3, it is possible that the probability of breakage when an indentation is made after the chemical strengthening becomes large. Preferably, the content ratio is 3.6 or more, typically 4 or more. When this content ratio is more than 6, viscosity of the glass increases, and meltability of the glass decreases. Preferably, the content ratio is 5.5 or less, more preferably 5 or less.

SO$_3$ is a component that operates as a refining agent, and is not essential but can be contained as necessary. When SO$_3$ is contained, an expected refining operation cannot be obtained if its content is less than 0.005%. Preferably, its content is 0.01% or more, more preferably 0.02% or more. Most preferably, its content is 0.03% or more. Further, when its content is more than 0.5%, it inversely becomes a source of bubbles, and it is possible that melting down of the glass becomes slow or the number of bubbles increases. Preferably, its content is 0.3% or less, more preferably 0.2% or less. Most preferably, its content is 0.1% or less.

SnO$_2$ is a component that operates as a refining agent, and is not essential but can be contained as necessary. When SnO$_2$ is contained, an expected refining operation cannot be obtained if its content is less than 0.005%. Preferably, its content is 0.01% or more, more preferably 0.05% or more. Further, when its content is more than 1%, it inversely becomes a source of bubbles, and it is possible that melting down of the glass becomes slow or the number of bubbles increases. Preferably, its content is 0.8% or less, more preferably 0.5% or less. Most preferably, its content is 0.3% or less.

TiO$_2$ is a component that improves weather resistance, is a color correcting component adjusting the color tone of the glass, and is not essential but can be contained as necessary. When TiO$_2$ is contained, it is possible that a significant effect cannot be obtained regarding improvement of weather resistance if its content is less than 0.005%. It is also possible that the color correcting effect cannot be obtained sufficiently, and that exhibition of, for example, bluish black or brownish black color tone in a black base color glass cannot be prevented sufficiently. Preferably, its content is 0.01% or more, typically 0.1% or more. When the content of TiO$_2$ is more than 1%, it is possible that the glass becomes unstable and devitrification occurs. Preferably, its content is 0.8% or less, typically 0.6% or less.

Li$_2$O is a component for improving meltability, and is not essential but can be contained as necessary. When Li$_2$O is contained, it is possible that a significant effect cannot be obtained regarding improvement of meltability if its content is less than 1%. Preferably, its content is 3% or more, typically 6% or more. When the content of Li$_2$O is more than 15%, it is possible that weather resistance decreases. Preferably, its content is 10% or less, typically 5% or less.

SrO is a component for improving meltability, and is not essential but can be contained as necessary. When SrO is contained, it is possible that a significant effect cannot be obtained regarding improvement of meltability if its content is less than 1%. Preferably, its content is 3% or more, typically 6% or more. When the content of SrO is more than 15%, it is possible that weather resistance and chemical strengthening characteristic decrease. Preferably, its content is 12% or less, typically 9% or less.

BaO is a component for improving meltability, and is not essential but can be contained as necessary. When BaO is contained, it is possible that a significant effect cannot be obtained regarding improvement of meltability if its content is less than 1%. Preferably, its content is 3% or more, typically 6% or more. When the content of BaO is more than 15%, it is possible that weather resistance and chemical strengthening characteristic decrease. Preferably, its content is 12% or less, typically 9% or less.

ZnO is a component for improving meltability, and is not essential but can be contained as necessary. When ZnO is contained, it is possible that a significant effect cannot be obtained regarding improvement of meltability if its content is less than 1%. Preferably, its content is 3% or more, typically 6% or more. When the content of ZnO is more than 15%, it is possible that weather resistance decreases. Preferably, its content is 12% or less, typically 9% or less.

CeO$_2$, Er$_2$O$_3$, Nd$_2$O$_3$ and SeO$_2$ are color correcting components for adjusting the color tone of the glass and are not essential, but at least one of these color correcting components can be contained as necessary.

When these color correcting components are contained, if each content is less than 0.01% the effect to reduce a difference in absorption characteristic of light within the wavelength range of a visible range for correcting to a desired black color cannot be obtained sufficiently, and it is possible that exhibition of, for example, bluish black or brownish black color tone cannot be prevented sufficiently. Each content of these color correcting components is preferably 0.05% or more, typically 0.1% or more. When each content of the color correcting components is more than 2%, it is possible that the glass becomes unstable and devitrification occurs.

Note that the type and amount of the above-described color correcting components can be appropriately selected and used depending on the component to be the parent component of each glass.

As the above-described color correcting components, it is preferred that the total content of TiO$_2$, CeO$_2$, Er$_2$O$_3$, Nd$_2$O$_3$ and SeO$_2$ be 0.005% to 2%. By making the total content of TiO$_2$, CeO$_2$, Er$_2$O$_3$, Nd$_2$O$_3$, SeO$_2$ be 0.005% or more, a difference in absorption characteristic of light within the wavelength range of a visible range can be reduced, and a glass having a color tone of what is called jet black which do not exhibit brown or blue color can be obtained. Further, by making the above-described content of color correcting components be 2% or less, it is possible to suppress the glass from becoming unstable which causes devitrification. The above-described total content of color correcting components is more preferably 0.01% to 1.8%, furthermore preferably 0.05% to 1.5%.

Next, a glass for chemical strengthening of a second embodiment will be described. Regarding the glass for chemical strengthening of the second embodiment below, the composition will be described using a content expressed in mole percentage unless otherwise particularly stated.

The glass for chemical strengthening according to the second embodiment contains, in mole percentage based on following oxides, 55% to 75% of SiO$_2$, 8% to 16% of Al$_2$O$_3$, 4% to 12% of B$_2$O$_3$, 7% to 16% of Na$_2$O, 0% to 4% of K$_2$O, 0% to 3% of MgO, 0% to 3% of CaO, 0% to 5% of ΣRO (where R represents Mg, Ca, Sr, Ba or Zn), 0% to 1% of ZrO$_2$, 1.5% to 6% of Fe$_2$O$_3$, and 0.1% to 1% of Co$_3$O$_4$.

SiO$_2$ is a component that forms a network former of the glass and hence is essential. When its content is less than 55%, stability as a glass decreases, or weather resistance decreases. Preferably, its content is 58% or more. More preferably, its content is 60% or more. When the content of SiO$_2$ is more than 75%, viscosity of the glass increases, and meltability decreases significantly. Preferably, its content is 70% or less, typically 68% or less.

Al$_2$O$_3$ is a component that improves weather resistance and chemical strengthening characteristic of the glass and is essential. When its content is less than 8%, the weather resistance decreases. Preferably, its content is 10% or more, typically 11% or more. When the content of $Al_2O_3$ is more than 16%, viscosity of the glass becomes high and uniform melting becomes difficult. Preferably, its content is 14% or less, typically 12% or less.

$B_2O_3$ is a component that improves weather resistance and is essential. When its content is less than 4%, the weather resistance decreases. Preferably, its content is 5% or more, typically 6% or more. When the content of $B_2O_3$ is more than 12%, it is possible that striae due to volatilization occur and the yield decreases. Preferably, its content is 11% or less, typically 10% or less.

$Na_2O$ is a component that improves meltability of the glass, and is essential because it causes a surface compressive stress layer to be formed by ion exchange. When its content is less than 7%, the meltability is poor and it is also difficult to form a desired surface compressive stress layer by ion exchange. Preferably, its content is 8% or more, typically 11% or more. When the content of $Na_2O$ is more than 16%, weather resistance decreases. Preferably, its content is 15% or less, typically 14% or less.

$K_2O$ is a component that improves meltability, and has an operation to increase ion exchange speed in chemical strengthening. Thus, this component is not essential but is preferred to be contained. When $K_2O$ is contained, if its content is less than 0.01%, it is possible that a significant effect cannot be obtained regarding improvement of meltability, or that a significant, effect cannot be obtained regarding ion exchange speed improvement. Typically, its content is 0.3% or more. When the content of $K_2O$ is more than 4%, weather resistance decreases. Preferably, its content is 3% or less, typically 2% or less.

MgO is a component that improves meltability, and is not essential but can be contained as necessary. When MgO is contained, if its content is less than 0.005%, it is possible that a significant effect cannot be obtained regarding improvement of meltability. Typically, its content is 0.01% or more. When the content of MgO is more than 3%, weather resistance decreases. Preferably, its content is 2% or less, typically 1% or less.

CaO is a component that improves meltability and can be contained as necessary. When CaO is contained, if its content is less than 0.01%, it is possible that a significant effect cannot be obtained regarding improvement of meltability. Typically, its content is 0.1% or more. When the content of CaO is more than 3%, the chemical strengthening characteristic decreases. Preferably, its content is 1% or less, typically 0.5% or less. Practically, it is preferred not to be contained.

RO (where R represents Mg, Ca, Sr, Ba or Zn) is a component that improves meltability and is not essential, but any one or more of them can be contained as necessary. In this case, it is possible that the meltability decreases when the total content of RO (where R represents Mg, Ca, Sr, Ba or Zn), i.e. the content of $\Sigma RO$, is less than 0.005%. Preferably, its content is 0.01% or more. When the content of $\Sigma RO$ (where R represents Mg, Ca, Sr, Ba or Zn) is more than 5%, weather resistance decreases. Preferably, its content is 3% or less, more preferably 2% or less, typically 1% or less.

$ZrO_2$ is a component that increases ion exchange speed and is not essential, but may be contained within the range 1% or less. When the content of $ZrO_2$ is more than 1%, meltability worsens and there may be cases where it remains as a non-melted matter in the glass. Typically, $ZrO_2$ is not contained.

$Fe_2O_3$ is an essential component for coloring a glass with a deep color. When the total iron content represented by $Fe_2O_3$ is less than 1.5%, a desired black glass cannot be obtained. Preferably, its content is 2% or more, more preferably 3% or more. When the content of $Fe_2O_3$ is more than 6%, the glass becomes unstable and devitrification occurs. Preferably, its content is 5% or less, more preferably 4% or less.

It is preferred that, among the total iron, the ratio of divalent iron content (iron redox) converted by $Fe_2O_3$ be 10% to 50%, particularly 15% to 40%. Most preferably, the iron redox is 20% to 30%. When the iron redox is less than 10%, decomposition of $SO_3$ does not proceed when $SO_3$ is contained, and it is possible that an expected refining effect cannot be obtained. When the iron redox is more than 50%, decomposition of $SO_3$ proceeds too much before refining, and it is possible that the expected refining effect cannot be obtained, or that it becomes a source of bubbles and increases the number of bubbles.

Note that in this specification, the content of the total iron converted into $Fe_2O_3$ represents the content of $Fe_2O_3$. Regarding the iron redox, the ratio of bivalent iron converted into $Fe_2O_3$ among the total iron converted into $Fe_2O_3$ by a Moessbauer spectroscopy can be represented by percent. Specifically, evaluation is performed with a transmission optical system in which a radiation source ($^{57}Co$), a glass sample (a glass flat plate having a thickness of 3 mm to 7 mm which is cut from the above-described glass block, grinded, and mirror polished), and a detector (45431 made by LND, Inc.) are disposed on a straight line. The radiation source is moved with respect to an axial direction of the optical system, so as to cause an energy change of $\gamma$ ray by a Doppler effect. Then, a Moessbauer absorption spectrum obtained at room temperature is used to calculate the ratio of bivalent Fe and trivalent Fe, and the ratio of bivalent Fe is taken as the iron redox.

$Co_3O_4$ is a coloring component, and is an essential component for exhibiting a refining effect while coexisting with iron. Specifically, $O_2$ bubbles discharged when trivalent iron becomes bivalent iron in a high-temperature state are absorbed when cobalt is oxidized. Consequently the $O_2$ bubbles are reduced, and thus the refining effect is obtained.

Moreover, $Co_3O_4$ is a component that further increases the refining operation when being allowed to coexist with $SO_3$. Specifically, for example, when a sodium sulfate ($Na_2SO_4$) is used as a refining agent, refining from the glass improves by allowing the reaction $SO_3 \rightarrow SO_2 + \frac{1}{2}O_2$ to proceed, and thus the oxygen partial pressure in the glass is preferred to be low. By co-adding cobalt to a glass containing iron, release of oxygen occurring due to reduction of iron can be suppressed by oxidation of cobalt, and thus decomposition of $SO_3$ is accelerated. Thus, it is possible to produce a glass with a small bubble defect.

Further, in a glass containing a relatively large amount of alkali metal for chemical strengthening, basicity of the glass increases, $SO_3$ does not decompose easily, and the refining effect decreases. In this manner, in the glass for chemical strengthening in which $SO_3$ does not decompose easily and which contains iron, addition of cobalt accelerates decomposition of $SO_3$, and hence is effective in particular for acceleration of a refining effect. In order for such a refining operation to occur, the content of $Co_3O_4$ is 0.1% or more, preferably 0.2% or more, typically 0.3% or more. When its content is more than 1%, the glass becomes unstable and devitrification occurs. Preferably, its content is 0.8% or less, more preferably 0.6% or less.

When the content ratio $Co_3O_4/Fe_2O_3$ is less than 0.01, it is possible that the above-described refining effect cannot be obtained. Preferably, the content ratio $Co_3O_4/Fe_2O_3$ is 0.05 or more, typically 0.1 or more. When the content ratio $Co_3O_4/Fe_2O_3$ is more than 0.5, it inversely becomes a source of bubbles, and it is possible that melting down of the glass becomes slow or the number of bubbles increases. Thus, a countermeasure such as using a separate refining agent, or the like needs to be taken. Preferably, the content ratio $Co_3O_4/Fe_2O_3$ is 0.3 or less, more preferably 0.2 or less.

NiO is a coloring component for coloring a glass with a desired black color, and is a component which is preferred to be used in the glass for chemical strengthening according to the embodiments. When NiO is contained, the effect as a coloring component cannot be obtained sufficiently if its content is less than 0.05%. Preferably, its content is 0.1% or more, more preferably 0.2% or more. When the content of NiO is more than 6%, brightness of the color tone of the glass becomes excessively high, and a desired black color tone cannot be obtained. Further, the glass becomes unstable and devitrification occurs. Preferably, its content is 5% or less, more preferably 4% or less.

$MnO$, $MnO_2$, $CuO$, $Cu_2O$, $Cr_2O_3$, $V_2O_5$, and $Bi_2O_3$ are coloring components and are not essential, but at least one of these color components can be contained as necessary. When these coloring components are contained, the effect as a coloring component cannot be obtained sufficiently if each content is less than 0.01%. Preferably, its content is 0.1% or more, more preferably 0.2% or more. Further, when each content is more than 6%, the glass becomes unstable and devitrification occurs. Preferably, its content is 5% or less, more preferably, 4% or less.

The content ratio $(SiO_2+Al_2O_3+B_2O_3)/(\Sigma R'_2O$ (where R' represents Na, K or Li)$+CaO+SrO+BaO+Fe_2O_3+Co_3O_4)$ means a ratio of a total content of reticulate oxides forming the network of the glass i.e. $SiO_2$, $Al_2O_3$, and $B_2O_3$, and a total content of main modified oxides i.e. $Na_2O$, $K_2O$, $Li_2O$, $CaO$, $SrO$, $BaO$, $Fe_2O_3$, and $Co_3O_4$. Note that $\Sigma R'_2O$ represents the sum of all the $R'_2O$ components i.e. "$Na_2O+K_2O+Li_2O$". When the content ratio $(SiO_2+Al_2O_3+B_2O_3)/(\Sigma R'_2O$ (where R' represents Na, K or Li)$+CaO+SrO+BaO+Fe_2O_3+Co_3O_4)$ is less than 3, it is possible that the probability of breakage when an indentation is made after the chemical strengthening becomes large. Preferably, the content ratio is 3.5 or more, typically 4 or more. When this content ratio is more than 6, viscosity of the glass increases, and meltability of the glass decreases. Preferably, the content ratio is 5.5 or less, more preferably 5 or less.

$SO_3$ is a component that operates as a refining agent, and is not essential but can be contained as necessary. When $SO_3$ is contained, an expected refining operation cannot be obtained if its content is less than 0.005%. Preferably, its content is 0.01% or more, more preferably 0.02% or more. Most preferably, its content is 0.03% or more. Further, when its content is more than 0.5%, it inversely becomes a source of bubbles, and it is possible that melting down of the glass becomes slow or the number of bubbles increases. Preferably, its content is 0.3% or less, more preferably 0.2% or less. Most preferably, its content is 0.1% or less.

$SnO_2$ is a component that operates as a refining agent, and is not essential but can be contained as necessary. When $SnO_2$ is contained, an expected refining operation cannot be obtained if its content is less than 0.005%. Preferably, its content is 0.01% or more, more preferably 0.05% or more. Further, when its content is more than 1%, it inversely becomes a source of bubbles, and it is possible that melting down of the glass becomes slow or the number of bubbles increases. Preferably, its content is 0.8% or less, more preferably 0.5% or less. Most preferably, its content is 0.3% or less.

$TiO_2$ is a component that improves weather resistance, is a color correcting component adjusting the color tone of the glass, and is not essential but can be contained as necessary. When $TiO_2$ is contained, it is possible that a significant effect cannot be obtained regarding improvement of weather resistance if its content is less than 0.005%. It is also possible that the color correcting effect cannot be obtained sufficiently, and that exhibition of, for example, bluish black or brownish black color tone in a black base color glass cannot be prevented sufficiently. Preferably, its content is 0.01% or more, typically 0.1% or more. When the content of $TiO_2$ is more than 1%, it is possible that the glass becomes unstable and devitrification occurs. Preferably, its content is 0.8% or less, typically 0.6% or less.

$Li_2O$ is a component for improving meltability, and is not essential but can be contained as necessary. When $Li_2O$ is contained, it is possible that a significant effect cannot be obtained regarding improvement of meltability if its content is less than 1%. Preferably, its content is 3% or more, typically 6% or more. When the content of $Li_2O$ is more than 15%, it is possible that weather resistance decreases. Preferably, its content is 10% or less, typically 5% or less.

SrO is a component for improving meltability, and is not essential but can be contained as necessary. When SrO is contained, it is possible that a significant effect cannot be obtained regarding improvement of meltability if its content is less than 1%. Preferably, its content is 3% or more, typically 6% or more. When the content of SrO is more than 15%, it is possible that weather resistance and chemical strengthening characteristic decrease. Preferably, its content is 12% or less, typically 9% or less.

BaO is a component for improving meltability, and is not essential but can be contained as necessary. When BaO is contained, it is possible that a significant effect cannot be obtained regarding improvement of meltability if its content is less than 1%. Preferably, its content is 3% or more, typically 6% or more. When the content of BaO is more than 15%, it is possible that weather resistance and chemical strengthening characteristic decrease. Preferably, its content is 12% or less, typically 9% or less.

ZnO is a component for improving meltability, and is not essential but can be contained as necessary. When ZnO is contained, it is possible that a significant effect cannot be obtained regarding improvement of meltability if its content is less than 1%. Preferably, its content is 3% or more, typically 6% or more. When the content of ZnO is more than 15%, it is possible that weather resistance decreases. Preferably, its content is 12% or less, typically 9% or less.

$CeO_2$, $Er_2O_3$, $Nd_2O_3$ and $SeO_2$ are color correcting components for adjusting the color tone of the glass and are not essential, but at least one of these color correcting components can be contained as necessary.

When these color correcting components are contained, if each content is less than 0.01% the effect to reduce a difference in absorption characteristic of light within the wavelength range of a visible range for correcting to a desired black color cannot be obtained sufficiently, and it is possible that exhibition of, for example, bluish black or brownish black color tone cannot be prevented sufficiently. Each content of these color correcting components is preferably 0.05% or more, typically 0.1% or more. When each content of the color correcting components is more than 2%, it is possible that the glass becomes unstable and devitrification occurs.

Note that the type and amount of the above-described color correcting components can be appropriately selected and used depending on the component to be the parent component of each glass.

As the above-described color correcting components, it is preferred that the total content of $TiO_2$, $CeO_2$, $Er_2O_3$, $Nd_2O_3$, $SeO_2$ be 0.005% to 2%. By making the total content of $TiO_2$, $CeO_2$, $Er_2O_3$, $Nd_2O_3$, $SeO_2$ be 0.005% or more, a difference in absorption characteristic of light within the wavelength range of a visible range can be reduced, and a glass having a color tone of what is called jet black which do not exhibit brown or blue color can be obtained. Further, by making the above-described content of color correcting components be 2% or less, it is possible to suppress the glass from becoming unstable which causes devitrification. The above-described total content of color correcting components is more preferably 0.01% to 1.8%, furthermore preferably 0.05% to 1.5%.

In both the glass for chemical strengthening according to the first embodiment and the second embodiment, the coloring component of the glass is essentially iron, but as described above, at least one metal oxide selected from the group consisting of oxides of Mn, Ni, Cu, Cr, V and Bi may be contained within the range not impairing the object of the present invention. When such a component is contained, the total content of these components is preferably 5% or less, typically 4% or less.

In both the glass for chemical strengthening according to the first embodiment and the second embodiment, Co is a coloring component and is also a refining agent. As the refining agent of the glass, $SO_3$ or $SnO_2$ may be used as necessary, but $Sb_2O_3$, Cl, F, and another component may be contained within the range not impairing the object of the present invention. When such a component is contained, it is preferred that the total content of these components is 1% or less, typically 0.5% or less. Note that $As_2O_3$ is an environment-affecting substance with which inverse effects to the environment are concerned not only in manufacturing processes but through the lifecycle of the product, and hence is not contained.

In the glass for chemical strengthening according to the embodiments, when an indentation is formed by using a Vickers indenter in a mirror-finished surface of a glass plate having a thickness of 1 mm made of the glass for chemical strengthening, a load of the Vickers indenter that causes a crack occurrence rate to be 50% is preferred to be 150 gf or more, more preferably 200 gf or more, furthermore preferably 300 gf or more. When the load of the Vickers indenter is less than 150 gf, a scratch can be easily made during a manufacturing process or while shipping before chemical strengthening, or even when chemical strengthening is performed, desired strength may not be obtained.

Note that the method for chemical strengthening the glass for chemical strengthening is not particularly limited as long as it is able to exchange ions between $Na_2O$ at the glass surface and $K_2O$ in a molten salt, but typically a method which will be described later can be applied.

Further, in the glass for chemical strengthening according to the embodiments, the minimum value of the absorption coefficient at wavelengths of 380 nm to 780 nm is preferred to be 1 $mm^{-1}$ or more. The light source of a display device provided inside an electronic device is constituted of one emitting white light such as a light emitting diode, an organic EL, or CCFL. Thus, when the glass for chemical strengthening according to the embodiments is used as the housing of an electronic device, it is necessary to make the minimum value of the absorption coefficient at wavelengths of 380 nm to 780 nm be 1 $mm^{-1}$ or more so that the white light does not leak to the outside of the device via the glass. The white light is to be recognized as white color by combining light of plural wavelengths in the visible range using a fluorescent material. Accordingly, by making the minimum value of the absorption coefficient at the wavelengths of a visible range of the glass be 1 $mm^{-1}$ or more, the white light is absorbed solely by the glass without separately providing light blocking means, and thus a sufficient light blocking effect as a glass is obtained.

When the minimum value of the absorption coefficient at wavelengths of 380 nm to 780 nm of the glass is less than 1 $mm^{-1}$, even when it is a glass having a sufficient thickness for housing purposes, a desired light blocking effect cannot be obtained, and it is possible that light transmits the glass. Further, when the glass is formed in a concave shape or convex shape, light may transmit a position where the thickness is smallest. When the thickness of the glass is small, the minimum value of the absorption coefficient at wavelengths of 380 nm to 780 nm of the glass is preferred to be 2 $mm^{-1}$ or more, more preferably 3 $mm^{-1}$ or more, furthermore preferably 4 $mm^{-1}$ or more.

The method for calculating the absorption coefficient in this specification is as follows. Both surfaces of a glass plate are mirror polished, and a thickness t is measured. Spectral transmittance T of this glass plate is measured (for example, an ultraviolet, visible, and near-infrared spectrophotometer V-570 made by JASCO Corporation is used). Then an absorption coefficient β is calculated using the relational expression $T=10^{-\beta t}$.

Further, in the glass for chemical strengthening according to the embodiments, a relative value of an absorption coefficient at a wavelength of 450 nm to an absorption coefficient at a wavelength of 600 nm, as calculated from a spectral transmittance curve of the glass (hereinafter, it may be referred to as "relative value of absorption coefficient (@450 nm/@600 nm)") and a relative value of an absorption coefficient at a wavelength of 550 nm to an absorption coefficient at a wavelength of 600 nm, as calculated from a spectral transmittance curve of the glass (hereinafter, it may be referred to as "relative value of absorption coefficient (@550 nm/@600 nm)") are both preferred to be within a range of 0.7 to 1.2. As described above, by selecting the predetermined metal oxides as coloring components for the glass, a glass exhibiting a black color can be obtained. However, depending on the types and the content of coloring components, although it is black, it may become brownish or bluish for example. To represent a black color which does not appear to be another color, namely, a jet black on a glass, a glass in which a variation in absorption coefficient in the wavelength of visible light is small, that is, a glass which averagely absorbs light in the visible range is preferred.

Thus, the relative value of absorption coefficient (@450 nm/@600 nm) and the relative value of absorption coefficient (@550 nm/@600 nm) are both preferred to be within the range of 0.7 to 1.2. When these relative values of absorption coefficients are smaller than 0.7, it is possible that the glass becomes bluish black. On the other hand, when these relative values of absorption coefficients are larger than 1.2, it is possible that the glass becomes brownish or greenish black.

Note that regarding the relative values of the absorption coefficients, when the relative value of absorption coefficient (@450 nm/@600 nm) and the relative value of absorption coefficient (@550 nm/@600 nm) both fall within the above-described range, this means that a black glass which does not appear to be another color can be obtained.

Further, in the glass for chemical strengthening according to the embodiments, preferably, absolute values of variations ΔT (550/600) and ΔT (450/600) calculated from relative values of the absorption coefficients as expressed by the following expressions (1) and (2) are 5% or less.

$$\Delta T(550/600)(\%)=[\{A(550/600)-B(550/600)\}/A(550/600)]\times 100 \quad (1)$$

$$\Delta T(450/600)(\%)=[\{A(450/600)-B(450/600)\}/A(450/600)]\times 100 \quad (2)$$

In the above expression (1), A(550/600) is a relative value of an absorption coefficient at a wavelength of 550 nm to an absorption coefficient at a wavelength of 600 nm, as calculated from a spectral transmittance curve of the glass after 100-hour irradiation with light of a 400 W high-pressure mercury lamp, and B(550/600) is a relative value of an absorption coefficient at a wavelength of 550 nm to an absorption coefficient at a wavelength of 600 nm, as calculated from a spectral transmittance curve of the glass before irradiation with the light.

In the above expression (2), A(450/600) is a relative value of an absorption coefficient at a wavelength of 450 nm to an absorption coefficient at a wavelength of 600 nm, as calculated from a spectral transmittance curve of the glass after 100-hour irradiation with light of a 400 W high-pressure mercury lamp, and B(450/600) is a relative value of an absorption coefficient at a wavelength of 450 nm to an absorption coefficient at a wavelength of 600 nm, as calculated from a spectral transmittance curve of the glass before irradiation with the light.

Note that "B(550/600)" in expression (1) and "relative value of absorption coefficient (@550 nm/@600 nm)" show the same meaning. Also "B(450/600)" in expression (2) and "relative value of absorption coefficient (@450 nm/@600 nm)" show the same meaning.

By the absolute values of variations $\Delta T$ (550/600) and $\Delta T$ (450/600) calculated from relative values of the absorption coefficients as expressed by the above expressions (1) and (2) being both within the above-described range, variation in absorption characteristic with respect to light at a wavelength of the visible range before and after irradiation of light can be suppressed, and it can be made as a glass in which variation in color tone is suppressed for a long period.

Specifically, for example, in the above expression (1), A(550/600) is a relative value of an absorption coefficient at a wavelength of 550 nm to an absorption coefficient at a wavelength of 600 nm, as calculated from a spectral transmittance curve of the glass after being irradiated with light of a 400 W high pressure mercury lamp for 100 hours from a separation distance of 15 cm to a polished surface of a glass having a thickness of 0.8 mm, which is optically mirror polished on both surfaces, and B (550/600) is a relative value of an absorption coefficient at a wavelength of 550 nm to an absorption coefficient at a wavelength of 600 nm, as calculated from a spectral transmittance curve of the glass before irradiation with the light.

Specifically, for example, in the above expression (2), A(450/600) is a relative value of an absorption coefficient at a wavelength of 450 nm to an absorption coefficient at a wavelength of 600 nm, as calculated from a spectral transmittance curve of the glass after irradiation with light of a 400 W high-pressure mercury lamp for 100 hours from a separation distance of 15 cm to a polished surface of a glass having a thickness of 0.8 mm, which is optically mirror polished on both surfaces, and B (450/600) is a relative value of an absorption coefficient at a wavelength of 450 nm to an absorption coefficient at a wavelength of 600 nm, as calculated from a spectral transmittance curve of the glass before irradiation with the light.

Further, in the glass for chemical strengthening according to the embodiments, a minimum value of absorbance at wavelengths of 380 nm to 780 nm is preferred to be 0.7 or more.

The light source of a display device provided inside an electronic device is constituted of one emitting white light such as a light emitting diode, an organic EL, or CCFL. Thus, when the glass for chemical strengthening according to the embodiments is used as the housing of an electronic device, it is necessary to make the minimum value of absorbance at wavelengths of 380 nm to 780 nm be 0.7 or more so that the white light does not leak to the outside of the device via the glass. The white light is to be recognized as white color by combining light of plural wavelengths in the visible range using a fluorescent material. Accordingly, by making the absorbance at the wavelengths of a visible range of the glass be 0.7 or more, the white light is absorbed solely by the glass without separately providing light blocking means, and thus a sufficient light blocking effect as a glass is obtained.

When the minimum value of the absorbance at wavelengths of 380 nm to 780 nm of the glass is less than 0.7, even when it is a glass having a sufficient thickness for housing purposes, a desired light blocking effect cannot be obtained, and it is possible that light transmits the glass. Further, when the glass is formed in a concave shape or convex shape, light may transmit a position where the thickness is smallest. The minimum value of the absorbance at wavelengths of 380 nm to 780 nm of the glass is preferred to be 0.9 or more, more preferably 1.2 or more, furthermore preferably 1.5 or more.

The method for calculating the absorbance in this specification is as follows. Both surfaces of a glass plate are mirror polished, and a thickness t is measured. Spectral transmittance T of this glass plate is measured (for example, an ultra-violet, visible, and near-infrared spectrophotometer V-570 made by JASCO Corporation is used). Then absorbance A is calculated using the relational expression $A = -\log_{10} T$.

Further, the glass for chemical strengthening according to the embodiments is preferred to have radio wave transparency. For example, in the case where the glass for chemical strengthening is applied as the housing of a portable phone or the like which includes a communication element in the device and performs transmission or reception of information using radio waves, when this glass for chemical strengthening has radio wave transparency, decrease in communication sensitivity due to the presence of the glass is suppressed. Regarding the radio wave transparency in the glass for chemical strengthening according to the embodiments, the maximum value of a dielectric loss tangent ($\tan \delta$) in the frequency range of 50 MHz to 3.0 GHz is preferred to be 0.02 or less. Preferably, the maximum value of $\tan \delta$ is 0.015 or less, more preferably 0.01 or less.

The method for manufacturing the glass for chemical strengthening according to the embodiments is not particularly limited. For example, appropriate amounts of various materials are blended, heated to about 1500° C. to about 1600° C. and melted, thereafter made uniform by refining, stirring, or the like, and formed in a plate shape or the like by a known down-draw method, press method, or the like, or casted and formed in a block shape. Then the glass is produced by cutting into a desired size after annealing, and polishing as necessary.

The method for chemical strengthening is not particularly limited as long as it is able to exchange ions between $Na_2O$ in the glass surface layer and $K_2O$ in a molten salt. For example, there is a method to immerse the glass in a heated potassium nitrate ($KNO_3$) molten salt. The condition for forming a chemical strengthened layer i.e. surface compressive stress layer having a desired surface compressive stress on the glass surface is, typically, immersing the glass in a $KNO_3$ molten salt at 400° C. to 550° C. for 2 to 20 hours, although it differs depending on the thickness of the glass.

Further, this $KNO_3$ molten salt may be one containing, for example, about 5% or less $NaNO_3$ besides the $KNO_3$.

The glass for chemical strengthening according to the embodiments is formed in a desired shape by the above-described manufacturing method. Further, to the glass for chemical strengthening according to the embodiments, for example after it is formed in the desired shape, the above-described method of chemical strengthening can be applied to produce a chemical strengthened glass. At this time, the depth of the surface compressive stress layer formed by the chemical strengthening is 6 μm to 70 μm. The reason of this is as follows.

In manufacturing of glasses used for decorative purposes, the surface of a glass may be polished, and the grain diameter of abrasive grain used for polishing in the final stage thereof is typically 2 μm to 6 μm.

By such abrasive grain, in the glass surface, it is conceivable that a micro-crack of 5 μm at most is finally formed. To make the strength improving effect by chemical strengthening be effective, it is necessary that a surface compressive stress layer deeper than the micro-crack formed in the glass surface is formed. Accordingly, the depth of the surface compressive stress layer formed due to chemical strengthening is 6 μm or more. Further, a scratch beyond the depth of the surface compressive stress layer being made when in use leads to breakage of the glass, and thus the surface compressive stress layer is preferred to be thick. Accordingly, the depth of the surface compressive stress layer is more preferably 10 μm or more, furthermore preferably 20 μm or more, typically 30 μm or more.

On a soda lime glass, by chemical strengthening by applying the above-described chemical strengthening method, the surface compressive stress of the surface compressive stress layer formed on the glass surface can be 50 MPa or more, but it is not easy to form the depth of the surface compressive stress layer to be 30 μm or more.

The glass for chemical strengthening according to the embodiments allows to form the surface compressive stress layer having a depth of 30 μm or more on the glass surface by chemical strengthening.

On the other hand, when the surface compressive stress layer is too deep, the internal tensile stress becomes large, and the impact at the time of breakage becomes large. Specifically, when the internal tensile stress is large, it is known that the glass tends to be small pieces and scatters when it breaks, making it more hazardous. As a result of experiment by the present inventors, it was found that in a glass having a thickness of 2 mm or less, when the depth of the surface compressive stress layer is more than 70 μm, scattering of small pieces of the glass at the time of breakage becomes significant. Therefore, in the glass for chemical strengthening according to the embodiments, the depth of the surface compressive stress layer is 70 μm or less. When it is used as a glass for decoration, although depending on its purpose, for example, when it is applied to a purpose such as a portable device having a high probability of receiving a contact scratch on its surface, it is conceivable to make the depth of the surface compressive stress layer thin in view of safety, as compared to when it is applied to an operating panel of a mounting type apparatus such as audiovisual apparatus or office automation apparatus. In this case, the depth of the surface compressive stress layer is more preferably 60 μm or less, furthermore preferably 50 μm or less, typically 40 μm or less.

Further, the glass for chemical strengthening according to the embodiments allows to obtain a chemical strengthened glass by performing chemical strengthening as described above, and the surface compressive stress of the surface compressive stress layer formed on the glass surface is preferably 550 MPa or more, more preferably 700 MPa or more. Further, the surface compressive stress of the surface compressive stress layer is typically 1200 MPa or less.

The glass for chemical strengthening according to the embodiments allows to form the surface compressive stress layer having surface compressive stress of 550 MPa or more on the glass surface by performing chemical strengthening.

In the glass for chemical strengthening according to the embodiments, when an indentation is formed by using a Vickers indenter in a mirror-finished surface of a glass plate having a thickness of 1 mm made of the glass for chemical strengthening, a load of the Vickers indenter that causes a crack occurrence rate to be 50% is preferably 150 gf or more. Hereinafter, when an indentation is formed by using a Vickers indenter in a mirror-finished surface of a glass plate having a thickness of 1 mm made of the glass for chemical strengthening, a load of the Vickers indenter that causes a crack occurrence rate to be 50% may be referred to as the CIL (crack initiation load) value. The CIL value of the glass for chemical strengthening according to the embodiments is more preferably 175 gf or more, and typically 200 gf or more.

In the foregoing, the examples of the glass for chemical strengthening according to the embodiments have been described, but the formation can be appropriately changed as necessary within a limit that does not go against the spirit of the present invention.

EXAMPLES

Hereinafter, the present invention will be described in detail based on examples, but the invention is not limited to these examples.

Regarding Examples 1 to 60 of Table 1 to Table 7 (Examples 1 to 58 are working examples, and Example 59 and Example 60 are comparative examples), generally used glass materials such as oxides, hydroxides, carbonates, nitrate salts, and the like were selected appropriately and measured to be 100 ml as a glass so that they are in compositions expressed in mole percentage in the tables. Note that $SO_3$ described in the tables is residual $SO_3$ remaining in the glass after sodium sulfate ($Na_2SO_4$) is added to the glass materials and after the sodium sulfate is decomposed, and is a calculated value.

Next, this material mixture was put into a melting pot made of platinum, placed in a resistance-heating electric furnace at 1500° C. to 1600° C., and after heated for about 0.5 hour and the materials were melted down, it was melted for one hour to refine. Thereafter, it was poured into a mold material preheated to approximately 630° C., which is about 50 mm length, about 100 mm width, and about 20 mm high, and annealed at the rate of about 1° C./min, thereby obtaining a glass block. This glass block was cut, and after the glass was cut out so that it has a size of 40 mm×40 mm and a thickness as illustrated in Tables 1 to 7, it was grinded and finally mirror polished on both surfaces, thereby obtaining a plate-shaped glass.

For the plate-shaped glass obtained, the minimum value of the absorption coefficient at wavelengths of 380 nm to 780 nm, relative values of absorption coefficients (relative value of absorption coefficient (@550 nm/@600 nm) and relative value of absorption coefficient (@450 nm/@600 nm)), absorbance, glass plate thickness "t", and CIL value are described together in Tables 1 to 7. Note that "-" in Tables 1 to 7 indicates that it is not measured.

TABLE 1

| [mol %] | E1 | E2 | E3 | E4 | E5 | E6 | E7 | E8 | E9 |
|---|---|---|---|---|---|---|---|---|---|
| $SiO_2$ | 61.8 | 61.8 | 61.8 | 70.1 | 69.1 | 66.0 | 61.8 | 61.6 | 61.9 |
| $B_2O_3$ | 0 | 0 | 0 | 0 | 0 | 0 | 6.7 | 9.2 | 0 |
| $Na_2O$ | 12.0 | 12.0 | 12.0 | 13.4 | 11.5 | 11.4 | 13.8 | 13.1 | 11.5 |
| $K_2O$ | 3.9 | 3.9 | 3.9 | 0 | 0 | 2.2 | 0.5 | 0.01 | 3.8 |
| MgO | 10.1 | 5.3 | 7.7 | 5.8 | 9.6 | 5.3 | 0.02 | 0.01 | 10.5 |
| CaO | 0 | 0 | 0 | 0 | 0 | 0.3 | 0.07 | 0.02 | 0 |
| BaO | 0 | 0 | 0 | 0 | 0 | 0 | 0 | 0 | 0 |
| SrO | 0 | 0 | 0 | 0 | 0 | 0 | 0 | 0 | 0 |
| $Al_2O_3$ | 7.7 | 12.5 | 10.1 | 6.7 | 5.8 | 10.2 | 13.4 | 12.1 | 5.8 |
| $TiO_2$ | 0 | 0 | 0 | 0 | 0 | 0.6 | 0 | 0 | 0 |
| $ZrO_2$ | 0.5 | 0.5 | 0.5 | 0 | 0 | 0 | 0 | 0 | 2.4 |
| $CeO_2$ | 0 | 0 | 0 | 0 | 0 | 0 | 0 | 0 | 0 |
| $Co_3O_4$ | 0.38 | 0.38 | 0.38 | 0.38 | 0.38 | 0.38 | 0.38 | 0.38 | 0.38 |
| $Fe_2O_3$ | 3.2 | 3.2 | 3.2 | 3.2 | 3.2 | 3.2 | 3.2 | 3.2 | 3.2 |
| $Er_2O_3$ | 0 | 0 | 0 | 0 | 0 | 0 | 0 | 0 | 0 |
| $Nd_2O_3$ | 0 | 0 | 0 | 0 | 0 | 0 | 0 | 0 | 0 |
| $SO_3$ | 0.38 | 0.38 | 0.38 | 0.37 | 0.37 | 0.38 | 0.37 | 0.37 | 0.37 |
| NiO | 0 | 0 | 0 | 0 | 0 | 0 | 0 | 0 | 0 |
| $MnO_2$ | 0 | 0 | 0 | 0 | 0 | 0 | 0 | 0 | 0 |
| CuO | 0 | 0 | 0 | 0 | 0 | 0 | 0 | 0 | 0 |
| $Co_3O_4/Fe_2O_3$ | 0.12 | 0.12 | 0.12 | 0.12 | 0.12 | 0.12 | 0.12 | 0.12 | 0.12 |
| $(SiO_2 + Al_2O_3 + B_2O_3)/(\Sigma R'_2O + CaO + SrO + BaO + Co_3O_4 + Fe_2O_3)$ | 3.57 | 3.81 | 3.69 | 4.52 | 4.97 | 4.36 | 4.56 | 4.96 | 3.59 |
| Absorption coefficient [mm$^{-1}$] (minimum value at wavelengths of 380 nm to 780 nm) | 1.120 | 4.870 | 1.280 | 1.260 | 1.490 | 3.050 | 4.920 | 4.920 | 1.140 |
| Relative value of absorption coefficient (@550 nm/@600 nm) | 0.76 | 0.97 | 0.81 | 0.78 | 0.82 | 1.02 | 1.00 | 1.00 | 3.07 |
| Relative value of absorption coefficient (@450 nm/@600 nm) | 0.73 | 0.99 | 0.88 | 0.64 | 0.80 | 1.07 | 1.01 | 0.99 | 3.07 |
| Plate thickness (mm) | 0.7 | 0.7 | 0.7 | 0.7 | 0.7 | 0.7 | 0.7 | 0.7 | 0.7 |
| Absorbance | 0.78 | 3.41 | 0.90 | 0.88 | 1.04 | 2.14 | 3.44 | 3.44 | 0.80 |
| CIL value (gf) | 320 | 193 | 290 | 406 | 700 | 524 | 277 | 1000< | 92 |
| Potassium ion diffusion depth (μm) | 35 | 43 | 45 | 27 | 19 | 32 | 44 | 31 | 30 |

E1 to E9 = Example 1 to Example 9

TABLE 2

| [mol %] | E10 | E11 | E12 | E13 | E14 | E15 | E16 | E17 | E18 |
|---|---|---|---|---|---|---|---|---|---|
| $SiO_2$ | 62.1 | 62.1 | 66.2 | 70.3 | 63.9 | 63.9 | 68.2 | 72.4 | 63.09 |
| $B_2O_3$ | 0 | 0 | 0 | 0 | 0 | 0 | 0 | 0 | 0 |
| $Na_2O$ | 12.1 | 11.6 | 11.5 | 13.5 | 12.4 | 11.9 | 11.8 | 13.9 | 12.27 |
| $K_2O$ | 3.8 | 3.8 | 2.2 | 0 | 4.0 | 4.0 | 2.3 | 0 | 3.93 |
| MgO | 10.1 | 10.6 | 5.3 | 5.8 | 10.4 | 10.9 | 5.5 | 6.0 | 10.3 |
| CaO | 0 | 0 | 0.3 | 0 | 0 | 0 | 0.35 | 0 | 0 |
| BaO | 0 | 0 | 0 | 0 | 0 | 0 | 0 | 0 | 0 |
| SrO | 0 | 0 | 0 | 0 | 0 | 0 | 0 | 0 | 0 |
| $Al_2O_3$ | 7.7 | 5.8 | 10.2 | 6.7 | 8.0 | 6.0 | 10.5 | 7.0 | 7.85 |
| $TiO_2$ | 0 | 0 | 0.6 | 0 | 0 | 0 | 0.6 | 0 | 0 |
| $ZrO_2$ | 0.5 | 2.4 | 0 | 0 | 0.5 | 2.5 | 0 | 0 | 0.49 |
| $CeO_2$ | 0 | 0 | 0 | 0 | 0 | 0 | 0 | 0 | 0 |
| $Co_3O_4$ | 0 | 0 | 0 | 0 | 0.4 | 0.4 | 0.4 | 0.4 | 0.1 |
| $Fe_2O_3$ | 3.2 | 3.2 | 3.2 | 3.2 | 0 | 0 | 0 | 0 | 1.87 |
| $Er_2O_3$ | 0 | 0 | 0 | 0 | 0 | 0 | 0 | 0 | 0 |
| $Nd_2O_3$ | 0 | 0 | 0 | 0 | 0 | 0 | 0 | 0 | 0 |
| $SO_3$ | 0.38 | 0.38 | 0.38 | 0.38 | 0.39 | 0.39 | 0.39 | 0.39 | 0.1 |
| NiO | 0 | 0 | 0 | 0 | 0 | 0 | 0 | 0 | 0 |
| $MnO_2$ | 0 | 0 | 0 | 0 | 0 | 0 | 0 | 0 | 0 |
| CuO | 0 | 0 | 0 | 0 | 0 | 0 | 0 | 0 | 0 |
| $Co_3O_4/Fe_2O_3$ | — | — | — | — | — | — | — | — | 0.05 |
| $(SiO_2 + Al_2O_3 + B_2O_3)/(\Sigma R'_2O + CaO + SrO + BaO + Co_3O_4 + Fe_2O_3)$ | 3.65 | 3.65 | 4.44 | 4.61 | 4.28 | 4.29 | 5.30 | 5.55 | 3.90 |
| Absorption coefficient [mm$^{-1}$] (minimum value at wavelengths of 380 nm to 780 nm) | 1.060 | 1.140 | 1.830 | 1.280 | 0.080 | 0.090 | 0.060 | 0.070 | 0.486 |
| Relative value of absorption coefficient (@550 nm/@600 nm) | 1.15 | 1.16 | 1.09 | 1.12 | 0.61 | 0.58 | 0.50 | 0.67 | 0.637 |
| Relative value of absorption coefficient (@450 nm/@600 nm) | 2.21 | 2.19 | 1.23 | 1.74 | 0.17 | 0.18 | 0.16 | 0.15 | 0.641 |

TABLE 2-continued

| [mol %] | E10 | E11 | E12 | E13 | E14 | E15 | E16 | E17 | E18 |
|---|---|---|---|---|---|---|---|---|---|
| Plate thickness (mm) | 0.7 | 0.7 | 0.7 | 0.7 | 9.1 | 8.6 | 12.3 | 10.6 | 1.7 |
| Absorbance | 0.74 | 0.80 | 1.28 | 0.90 | 0.73 | 0.77 | 0.74 | 0.74 | 0.82 |
| CIL value (gf) | 252 | 100 | 569 | 311 | 722 | 120 | 826 | 763 | — |
| Potassium ion diffusion depth (μm) | 35 | 31 | 33* | 28* | 47* | 40 | 43* | 38* | — |

E10 to E18 = Example 10 to Example 18

TABLE 3

| [mol %] | E19 | E20 | E21 | E22 | E23 | E24 | E25 | E26 | E27 |
|---|---|---|---|---|---|---|---|---|---|
| $SiO_2$ | 63.8 | 64.0 | 63.42 | 63.48 | 63.54 | 62.59 | 63.21 | 63.69 | 63.8 |
| $B_2O_3$ | 0 | 0 | 0 | 0 | 0 | 0 | 0 | 0 | 0 |
| $Na_2O$ | 12.41 | 12.44 | 12.33 | 12.34 | 12.35 | 12.17 | 12.29 | 12.38 | 12.4 |
| $K_2O$ | 3.97 | 3.98 | 3.94 | 3.95 | 3.95 | 3.89 | 3.93 | 3.96 | 3.97 |
| MgO | 10.42 | 10.45 | 10.36 | 10.37 | 10.38 | 10.22 | 10.32 | 10.4 | 10.42 |
| CaO | 0 | 0 | 0 | 0 | 0 | 0 | 0 | 0 | 0 |
| BaO | 0 | 0 | 0 | 0 | 0 | 0 | 0 | 0 | 0 |
| SrO | 0 | 0 | 0 | 0 | 0 | 0 | 0 | 0 | 0 |
| $Al_2O_3$ | 7.94 | 7.96 | 7.89 | 7.9 | 7.91 | 7.79 | 7.86 | 7.92 | 7.94 |
| $TiO_2$ | 0 | 0 | 0 | 0 | 0 | 0.24 | 0.25 | 0 | 0.25 |
| $ZrO_2$ | 0.5 | 0.5 | 0.49 | 0.49 | 0.49 | 0.41 | 0.42 | 0.5 | 0.42 |
| $CeO_2$ | 0 | 0 | 0 | 0 | 0 | 0 | 0 | 0 | 0 |
| $Co_3O_4$ | 0.07 | 0.07 | 0.04 | 0.04 | 0.04 | 0 | 0 | 0.06 | 0.05 |
| $Fe_2O_3$ | 0.015 | 0.02 | 1.13 | 1.14 | 1.14 | 0 | 0 | 0.01 | 0.018 |
| $Er_2O_3$ | 0 | 0 | 0 | 0 | 0 | 0 | 0 | 0 | 0 |
| $Nd_2O_3$ | 0 | 0 | 0 | 0 | 0 | 0 | 0 | 0 | 0 |
| $SO_3$ | 0.1 | 0.1 | 0.1 | 0.1 | 0.1 | 0.1 | 0.1 | 0.1 | 0.1 |
| NiO | 0.75 | 0.5 | 0.3 | 0.2 | 0.1 | 0.64 | 0.65 | 0.5 | 0.65 |
| $MnO_2$ | 0 | 0 | 0 | 0 | 0 | 0 | 0 | 0 | 0 |
| CuO | 0 | 0 | 0 | 0 | 0 | 1.95 | 0.98 | 0 | 0 |
| $Co_3O_4/Fe_2O_3$ | 4.67 | 3.50 | 0.04 | 0.04 | 0.04 | — | — | 6.00 | 2.78 |
| $(SiO_2 + Al_2O_3 + B_2O_3)/(\Sigma R'_2O + CaO + SrO + BaO + Co_3O_4 + Fe_2O_3)$ | 4.36 | 4.36 | 4.09 | 4.09 | 4.09 | 4.36 | 4.38 | 4.36 | 4.36 |
| Absorption coefficient [$mm^{-1}$] (minimum value at wavelengths of 380 nm to 780 nm) | 0.096 | 0.076 | 0.361 | 0.357 | 0.337 | 0.741 | 0.333 | 0.083 | 0.090 |
| Relative value of absorption coefficient (@550 nm/@600 nm) | 0.771 | 0.701 | 0.757 | 0.720 | 0.667 | 0.996 | 1.116 | 0.799 | 0.817 |
| Relative value of absorption coefficient (@450 nm/@600 nm) | 0.857 | 0.654 | 0.944 | 0.824 | 0.668 | 1.663 | 1.887 | 0.752 | 0.933 |
| Plate thickness (mm) | 7.3 | 9.2 | 2.9 | 3.1 | 2.1 | 1.6 | 2.9 | 8.4 | 7.8 |
| Absorbance | 0.70 | 0.70 | 1.04 | 1.11 | 0.80 | 1.16 | 0.97 | 0.70 | 0.70 |
| CIL value (gf) | — | — | — | — | — | — | — | — | — |
| Potassium ion diffusion depth (μm) | — | — | — | — | — | — | — | — | — |

E19 to E27 = Example 19 to Example 27

TABLE 4

| [mol %] | E28 | E29 | E30 | E31 | E32 | E33 | E34 | E35 | E36 |
|---|---|---|---|---|---|---|---|---|---|
| $SiO_2$ | 63.22 | 63.0 | 63.19 | 64.8 | 63.31 | 63.69 | 63.48 | 64.08 | 64.4 |
| $B_2O_3$ | 0 | 0 | 0 | 0 | 0 | 0 | 0 | 0 | 0 |
| $Na_2O$ | 12.29 | 12.25 | 12.28 | 13.79 | 12.31 | 12.78 | 12.34 | 13.63 | 13.7 |
| $K_2O$ | 3.93 | 3.92 | 3.93 | 3.94 | 3.94 | 3.93 | 3.95 | 3.9 | 3.91 |
| MgO | 10.32 | 10.29 | 10.32 | 7.39 | 10.34 | 9.34 | 10.37 | 7.3 | 7.34 |
| CaO | 0 | 0 | 0 | 0 | 0 | 0 | 0 | 0 | 0 |
| BaO | 0 | 0 | 0 | 0 | 0 | 0 | 0 | 0 | 0 |
| SrO | 0 | 0 | 0 | 0 | 0 | 0 | 0 | 0 | 0 |
| $Al_2O_3$ | 7.87 | 7.84 | 7.86 | 7.88 | 7.88 | 7.86 | 7.9 | 7.79 | 7.83 |
| $TiO_2$ | 0.25 | 0.73 | 0.25 | 0.25 | 0.25 | 0.25 | 0.25 | 0.24 | 0.24 |
| $ZrO_2$ | 0.49 | 0.49 | 0.49 | 0.42 | 0.49 | 0.42 | 0.42 | 0.41 | 0.42 |
| $CeO_2$ | 0 | 0 | 0 | 0 | 0 | 0 | 0 | 0 | 0 |
| $Co_3O_4$ | 0.05 | 0.06 | 0.06 | 0.06 | 0.06 | 0.04 | 0.05 | 0.05 | 0.05 |
| $Fe_2O_3$ | 1.03 | 1.03 | 1.03 | 1.03 | 1.03 | 0.025 | 0.015 | 0.02 | 0.01 |
| $Er_2O_3$ | 0 | 0 | 0 | 0 | 0 | 0 | 0 | 0 | 0 |
| $Nd_2O_3$ | 0 | 0 | 0 | 0 | 0 | 0 | 0 | 0 | 0 |
| $SO_3$ | 0.1 | 0.1 | 0.1 | 0.1 | 0.1 | 0.1 | 0.1 | 0.1 | 0.1 |
| NiO | 0.44 | 0.29 | 0.25 | 0.34 | 0.3 | 0.61 | 0.65 | 0.54 | 0.54 |
| $MnO_2$ | 0 | 0 | 0 | 0 | 0 | 0 | 0 | 0 | 0 |
| CuO | 0 | 0 | 0 | 0 | 0 | 0.98 | 0.49 | 1.95 | 1.47 |
| $Co_3O_4/Fe_2O_3$ | 0.05 | 0.06 | 0.06 | 0.06 | 0.06 | 1.60 | 3.33 | 2.50 | 5.00 |
| $(SiO_2 + Al_2O_3 + B_2O_3)/(\Sigma R'_2O + CaO + SrO + BaO + Co_3O_4 + Fe_2O_3)$ | 4.11 | 4.10 | 4.11 | 3.86 | 4.11 | 4.27 | 4.36 | 4.08 | 4.09 |

TABLE 4-continued

| [mol %] | E28 | E29 | E30 | E31 | E32 | E33 | E34 | E35 | E36 |
|---|---|---|---|---|---|---|---|---|---|
| Absorption coefficient [mm$^{-1}$] (minimum value at wavelengths of 380 nm to 780 nm) | 0.350 | 0.342 | 0.331 | 0.340 | 0.322 | 0.308 | 0.184 | 0.492 | 0.373 |
| Relative value of absorption coefficient (@550 nm/@600 nm) | 0.794 | 0.725 | 0.702 | 0.738 | 0.703 | 0.791 | 0.807 | 0.757 | 0.769 |
| Relative value of absorption coefficient (@450 nm/@600 nm) | 0.966 | 0.842 | 0.753 | 0.634 | 0.773 | 0.874 | 0.956 | 0.666 | 0.670 |
| Plate thickness (mm) | 2.4 | 2.2 | 2.2 | 2.4 | 3.1 | 2.4 | 4.0 | 2.1 | 2.3 |
| Absorbance | 0.84 | 0.76 | 0.73 | 0.80 | 0.99 | 0.74 | 0.73 | 1.03 | 0.87 |
| CIL value (gf) | — | — | — | — | — | — | — | — | — |
| Potassium ion diffusion depth (μm) | — | — | — | — | — | — | — | — | — |

E28 to E36 = Example 28 to Example 36

TABLE 5

| [mol %] | E37 | E38 | E39 | E40 | E41 | E42 | E43 | E44 | E45 |
|---|---|---|---|---|---|---|---|---|---|
| SiO$_2$ | 64.97 | 64.84 | 63.17 | 64.65 | 64.08 | 63.43 | 63.68 | 63.13 | 63.44 |
| B$_2$O$_3$ | 0 | 0 | 0 | 0 | 0 | 0 | 0 | 0 | 0 |
| Na$_2$O | 13.82 | 13.8 | 12.28 | 13.75 | 13.63 | 12.53 | 12.78 | 12.27 | 12.33 |
| K$_2$O | 3.95 | 3.94 | 3.97 | 3.93 | 3.90 | 3.93 | 3.93 | 3.93 | 3.95 |
| MgO | 7.4 | 7.39 | 10.32 | 7.37 | 7.30 | 9.83 | 9.34 | 10.31 | 10.36 |
| CaO | 0 | 0 | 0 | 0 | 0 | 0 | 0 | 0 | 0 |
| BaO | 0 | 0 | 0 | 0 | 0 | 0 | 0 | 0 | 0 |
| SrO | 0 | 0 | 0 | 0 | 0 | 0 | 0 | 0 | 0 |
| Al$_2$O$_3$ | 7.9 | 7.88 | 7.86 | 7.86 | 7.79 | 7.86 | 7.86 | 7.85 | 7.89 |
| TiO$_2$ | 0.25 | 0.25 | 0.25 | 0.25 | 0.24 | 0.25 | 0.25 | 0.25 | 0.25 |
| ZrO$_2$ | 0.42 | 0.42 | 0.42 | 0.42 | 0.41 | 0.42 | 0.42 | 0.49 | 0.49 |
| CeO$_2$ | 0 | 0 | 0 | 0 | 0 | 0 | 0 | 0.98 | 0.49 |
| Co$_3$O$_4$ | 0.05 | 0.05 | 0.05 | 0.05 | 0.05 | 0.05 | 0.04 | 0.05 | 0.05 |
| Fe$_2$O$_3$ | 0.025 | 0.021 | 0.016 | 0.015 | 0.022 | 0.01 | 0 | 0.012 | 0.012 |
| Er$_2$O$_3$ | 0 | 0 | 0 | 0 | 0 | 0 | 0 | 0 | 0 |
| Nd$_2$O$_3$ | 0 | 0 | 0 | 0 | 0 | 0 | 0 | 0 | 0 |
| SO$_3$ | 0.1 | 0.1 | 0.1 | 0.1 | 0.1 | 0.1 | 0.1 | 0.1 | 0.1 |
| NiO | 0.55 | 0.55 | 0.64 | 0.64 | 0.54 | 0.63 | 0.62 | 0.64 | 0.65 |
| MnO$_2$ | 0 | 0 | 0 | 0 | 0 | 0 | 0 | 0 | 0 |
| CuO | 0.59 | 0.79 | 0.98 | 0.98 | 1.95 | 0.98 | 0.98 | 0 | 0 |
| Co$_3$O$_4$/Fe$_2$O$_3$ | 2.00 | 2.38 | 3.13 | 3.33 | 2.27 | 5.00 | — | 4.17 | 4.17 |
| (SiO$_2$ + Al$_2$O$_3$ + B$_2$O$_3$)/(ΣR'$_2$O + CaO + SrO + BaO + Co$_3$O$_4$ + Fe$_2$O$_3$) | 4.08 | 4.08 | 4.35 | 4.09 | 4.08 | 4.32 | 4.27 | 4.36 | 4.36 |
| Absorption coefficient [mm$^{-1}$] (minimum value at wavelengths of 380 nm to 780 nm) | 0.149 | 0.188 | 0.349 | 0.247 | 0.543 | 0.325 | 0.307 | 0.125 | 0.121 |
| Relative value of absorption coefficient (@550 nm/@600 nm) | 0.784 | 0.779 | 0.771 | 0.797 | 0.745 | 0.779 | 0.801 | 0.821 | 0.816 |
| Relative value of absorption coefficient (@450 nm/@600 nm) | 0.632 | 0.626 | 0.901 | 0.696 | 0.649 | 0.888 | 0.902 | 1.046 | 1.014 |
| Plate thickness (mm) | 5.0 | 3.8 | 3.4 | 3.6 | 2.1 | 2.3 | 3.3 | 5.7 | 6.2 |
| Absorbance | 0.75 | 0.72 | 1.20 | 0.89 | 1.14 | 0.75 | 1.02 | 0.71 | 0.75 |
| CIL value (gf) | — | — | — | — | — | — | — | — | — |
| Potassium ion diffusion depth (μm) | — | — | — | — | — | — | — | — | — |

E37 to E45 = Example 37 to Example 45

TABLE 6

| [mol %] | E46 | E47 | E48 | E49 | E50 | E51 | E52 | E53 | E54 |
|---|---|---|---|---|---|---|---|---|---|
| SiO$_2$ | 63.59 | 63.69 | 63.03 | 62.97 | 63.12 | 63.2 | 63.12 | 63.22 | 63.25 |
| B$_2$O$_3$ | 0 | 0 | 0 | 0 | 0 | 0 | 0 | 0 | 0 |
| Na$_2$O | 12.36 | 12.38 | 12.25 | 12.24 | 12.27 | 12.29 | 12.27 | 12.29 | 12.3 |
| K$_2$O | 3.96 | 3.96 | 3.92 | 3.92 | 3.93 | 3.93 | 3.93 | 3.93 | 3.93 |
| MgO | 10.38 | 10.4 | 10.29 | 10.28 | 10.31 | 10.32 | 10.31 | 10.32 | 10.33 |
| CaO | 0 | 0 | 0 | 0 | 0 | 0 | 0 | 0 | 0 |
| BaO | 0 | 0 | 0 | 0 | 0 | 0 | 0 | 0 | 0 |
| SrO | 0 | 0 | 0 | 0 | 0 | 0 | 0 | 0 | 0 |
| Al$_2$O$_3$ | 7.91 | 7.92 | 7.84 | 7.83 | 7.85 | 7.86 | 7.85 | 7.87 | 7.87 |
| TiO$_2$ | 0.25 | 0.25 | 0.25 | 0.24 | 0.25 | 0.25 | 0.25 | 0.25 | 0.25 |
| ZrO$_2$ | 0.49 | 0.5 | 0.49 | 0.49 | 0.49 | 0.49 | 0.49 | 0.49 | 0.49 |
| CeO$_2$ | 0.25 | 0.1 | 0 | 0 | 0 | 0 | 0 | 0 | 0 |
| Co$_3$O$_4$ | 0.05 | 0.05 | 0.06 | 0.06 | 0.06 | 0.06 | 0.06 | 0.06 | 0.06 |
| Fe$_2$O$_3$ | 0.02 | 0.014 | 1.03 | 1.03 | 1.03 | 1.03 | 1.03 | 1.03 | 1.03 |
| Er$_2$O$_3$ | 0 | 0 | 0.39 | 0 | 0 | 0 | 0 | 0 | 0 |
| Nd$_2$O$_3$ | 0 | 0 | 0 | 0.49 | 0.25 | 0.12 | 0 | 0 | 0 |

TABLE 6-continued

| [mol %] | E46 | E47 | E48 | E49 | E50 | E51 | E52 | E53 | E54 |
|---|---|---|---|---|---|---|---|---|---|
| $SO_3$ | 0.1 | 0.1 | 0.1 | 0.1 | 0.1 | 0.1 | 0.1 | 0.1 | 0.1 |
| NiO | 0.65 | 0.65 | 0.34 | 0.34 | 0.34 | 0.34 | 0.34 | 0.34 | 0.34 |
| $MnO_2$ | 0 | 0 | 0 | 0 | 0 | 0 | 0.25 | 0.1 | 0.05 |
| CuO | 0 | 0 | 0 | 0 | 0 | 0 | 0 | 0 | 0 |
| $Co_3O_4/Fe_2O_3$ | 2.50 | 3.57 | 0.06 | 0.06 | 0.06 | 0.06 | 0.06 | 0.06 | 0.06 |
| $(SiO_2 + Al_2O_3 + B_2O_3)/$ $(\Sigma R'_2O + CaO + SrO + BaO + Co_3O_4 + Fe_2O_3)$ | 4.36 | 4.37 | 4.11 | 4.11 | 4.10 | 4.11 | 4.10 | 4.11 | 4.11 |
| Absorption coefficient [$mm^{-1}$] (minimum value at wavelengths of 380 nm to 780 nm) | 0.115 | 0.120 | 0.347 | 0.348 | 0.346 | 0.356 | 0.340 | 0.339 | 0.342 |
| Relative value of absorption coefficient (@550 nm/@600 nm) | 0.825 | 0.819 | 0.735 | 0.690 | 0.707 | 0.716 | 0.746 | 0.744 | 0.722 |
| Relative value of absorption coefficient (@450 nm/@600 nm) | 1.005 | 0.985 | 0.850 | 0.810 | 0.825 | 0.822 | 0.849 | 0.831 | 0.827 |
| Plate thickness (mm) | 6.3 | 6.7 | 2.4 | 2.4 | 2.3 | 2.2 | 2.1 | 2.7 | 2.7 |
| Absorbance | 0.73 | 0.80 | 0.83 | 0.84 | 0.78 | 0.80 | 0.73 | 0.90 | 0.94 |
| CIL value (gf) | — | — | — | — | — | — | — | — | — |
| Potassium ion diffusion depth (μm) | — | — | — | — | — | — | — | — | — |

E46 to E54 = Example 46 to Example 54

TABLE 7

| [mol %] | E55 | E56 | E57 | E58 | E59 | E60 |
|---|---|---|---|---|---|---|
| $SiO_2$ | 63.27 | 62.99 | 63.12 | 63.72 | 72.0 | 64.3 |
| $B_2O_3$ | 0 | 0 | 0 | 0 | 0 | 0 |
| $Na_2O$ | 12.3 | 12.25 | 12.27 | 12.39 | 12.6 | 12.0 |
| $K_2O$ | 3.94 | 3.92 | 3.93 | 3.96 | 0.2 | 4.0 |
| MgO | 10.33 | 10.29 | 10.31 | 10.4 | 5.5 | 11.0 |
| CaO | 0 | 0 | 0 | 0 | 8.6 | 0.1 |
| BaO | 0 | 0 | 0 | 0 | 0 | 0 |
| SrO | 0 | 0 | 0 | 0 | 0 | 0.1 |
| $Al_2O_3$ | 7.87 | 7.84 | 7.85 | 7.93 | 1.1 | 6.0 |
| $TiO_2$ | 0.25 | 0 | 0 | 0.25 | 0 | 0 |
| $ZrO_2$ | 0.49 | 0.49 | 0.49 | 0.5 | 0 | 2.5 |
| $CeO_2$ | 0 | 0 | 0 | 0 | 0 | 0 |
| $Co_3O_4$ | 0.06 | 0.07 | 0.07 | 0.04 | 0 | 0 |
| $Fe_2O_3$ | 1.03 | 1.67 | 1.67 | 0.25 | 0 | 0.01 |
| $Er_2O_3$ | 0 | 0.39 | 0.2 | 0 | 0 | 0 |
| $Nd_2O_3$ | 0 | 0 | 0 | 0 | 0 | 0 |
| $SO_3$ | 0.1 | 0.1 | 0.1 | 0.1 | 0 | 0.09 |
| NiO | 0.34 | 0 | 0 | 0.46 | 0 | 0 |
| $MnO_2$ | 0.01 | 0 | 0 | 0 | 0 | 0 |
| CuO | 0 | 0 | 0 | 0 | 0 | 0 |
| $Co_3O_4/Fe_2O_3$ | 0.06 | 0.04 | 0.04 | 0.16 | — | — |
| $(SiO_2 + Al_2O_3 + B_2O_3)/$ $(\Sigma R'_2O + CaO + SrO + BaO + Co_3O_4 + Fe_2O_3)$ | 4.11 | 3.95 | 3.96 | 4.31 | 3.42 | 4.34 |
| Absorption coefficient [$mm^{-1}$] (minimum value at wavelengths of 380 nm to 780 nm) | 0.349 | 0.419 | 0.420 | 0.164 | — | 0 |
| Relative value of absorption coefficient (@550 nm/@600 nm) | 0.734 | 0.638 | 0.635 | 0.791 | — | 0 |
| Relative value of absorption coefficient (@450 nm/@600 nm) | 0.830 | 0.632 | 0.620 | 0.920 | — | 0 |
| Plate thickness (mm) | 2.3 | 2.0 | 2.4 | 4.5 | — | — |
| Absorbance | 0.82 | 0.84 | 0.99 | 0.74 | — | — |
| CIL value (gf) | — | — | — | — | — | 300 |
| Potassium ion diffusion depth (μm) | — | — | — | — | — | 45 |

E55 to E60 = Example 55 to Example 60

In tables 1 to 7, $\Sigma R'_2O$ means "$Na_2O+K_2O+Li_2O$". The absorption coefficient was obtained by the following method. The thickness t of the plate-shaped glass, whose both surfaces were mirror polished, was measured with a vernier caliper. The spectral transmittance T of this glass was measured using an ultraviolet, visible, and near-infrared spectrophotometer (V-570 made by JASCO Corporation). Then, the absorption coefficient β was calculated using a relational expression $T=10^{-\beta t}$. Subsequently, the minimum value of the absorption coefficient at wavelengths of 380 nm to 780 nm was obtained. Further, from the obtained absorption coefficient, the relative values of absorption coefficients (relative value of absorption coefficient (@550 nm/@600 nm) and relative value of absorption coefficient (@450 nm/@600 nm)) were calculated. Further, the absorbance A was calculated using a relational expression $A=-\log_{10} T$.

The CIL (crack initiation load) value was obtained by the following method. A plate-shaped glass having a thickness of 1 mm, whose both surfaces were mirror polished, was prepared. In a Vickers hardness tester, a Vickers indenter was pushed in for 15 seconds and then removed, and the vicinity of the indentation was observed after 15 seconds passed. In the observation, the number of cracks occurred was checked from a corner of the indentation. The measurement was performed on ten glasses for each of loads of the Vickers indenter of 50 gf, 100 gf, 200 gf, 300 gf, 500 gf, 1 kgf. The average value of the number of cracks occurred was calculated for each load. The relation between the load and the number of cracks was regression calculated using a sigmoid function. From the regression calculation result, the load by which the number of cracks becomes two was taken as the CIL value (gf) of the glass. Note because the Vickers indenter has 4 corners, at most 4 cracks are able to occur from the indentation. Therefore it means that the crack occurrence rate is 50% that two cracks occurred.

From the evaluation result of the absorption coefficient, in the glasses of Examples 1 to 58 as working examples, the minimum value of the absorption coefficient at wavelengths of 380 nm to 780 nm is 1 mm$^{-1}$ or more, or the minimum value of the absorbance at wavelengths of 380 nm to 780 nm is 0.7 or more, from which it can be seen that a certain degree or more of light of a wavelength in the visible range is absorbed. By using these glasses for the housing of an electronic device, a high light blocking effect can be obtained.

Further, from the above evaluation result of the absorption coefficient, in part of glasses of Examples 1 to 58 containing 0.1% to 7% in total of $Co_3O_4$, $Fe_2O_3$, NiO, $MnO_2$, $Cr_2O_3$, $Cu_2O$, CuO as coloring components, each relative value of the absorption coefficient (relative value of absorption coefficient (@550 nm/@600 nm) and relative value of absorption coefficient (@450 nm/@600 nm)) is within the range of 0.7 to 1.2, from which it can be seen that it is a glass which averagely absorbs light in the visible range. Accordingly, for example, a black glass whose color tone is jet black can be obtained, which is different from brownish black and bluish black.

From the evaluation result of the above CIL value, it can be seen that the glasses of Examples 1 to 17 are glasses with high strength which is hard to be scratched. The glass before chemical strengthening is scratched through manufacturing processes or during shipping, and the scratch becomes an origin of breakage after chemical strengthening and becomes a factor of decreasing the strength of the glass.

The CIL value of a typical soda lime glass is about 150 gf as an example, whereas the CIL value of each glass of Examples 1 to 8, 10, 12 to 14, 16 and 17 as working examples is larger than that of the soda lime glass, from which it is presumed that a glass having high strength can be obtained after chemical strengthening.

Regarding the number of bubbles, to confirm the effect of $Fe_2O_3$ and $Co_3O_4$, the glass components and contents other than $Fe_2O_3$ and $Co_3O_4$ were assumed to be the same, and the number of bubbles was checked for each one containing both $Fe_2O_3$ and $Co_3O_4$, each one containing only $Fe_2O_3$, and each one containing only $Co_3O_4$.

Regarding the number of bubbles, the number of bubbles of an area of 0.6 cm$^3$ was measured at four positions on the aforementioned plate-shaped glass under a high-intensity light source (LA-100T made by Hayashi Watch-works), and a value converted from the average value of measurement values therefrom in unit volume (cm$^3$) was presented.

The number of bubbles is largely affected by a parent composition and a melting temperature of the glass, and hence, as described above, the components and contents other than $Fe_2O_3$ and $Co_3O_4$ were assumed to be the same, and comparison of ones at the same melting temperatures was performed. Results are illustrated in Table 8.

TABLE 8

|  | Contain $Fe_2O_3$ and $Co_3O_4$ | Contain only $Fe_2O_3$ | Contain only $Co_3O_4$ |
| --- | --- | --- | --- |
|  | Example 1 | Example 10 | Example 14 |
| Number of bubbles [bubbles/cm$^3$] Melting temperature: 1500° C. | 42 | 65 | 59 |
|  | Example 9 | Example 11 | Example 15 |
| Number of bubbles [bubbles/cm$^3$] Melting temperature: 1500° C. | 5 | 22 | 8 |
|  | Example 6 | Example 12 | Example 16 |
| Number of bubbles [bubbles/cm$^3$] Melting temperature: 1550° C. | 26 | 40 | 78 |
|  | Example 4 | Example 13 | Example 17 |
| Number of bubbles [bubbles/cm$^3$] Melting temperature: 1550° C. | 27 | 32 | 70 |

From these results, in any one of the glass compositions, one containing both $Fe_2O_3$ and $Co_3O_4$ had a smaller number of bubbles than one containing only $Fe_2O_3$ and one containing only $Co_3O_4$. This supports that coexisting $Co_3O_4$ and $Fe_2O_3$ exhibit a refining effect at the time of melting of the glass. Specifically, it is conceivable that, since $O_2$ bubbles released when trivalent Fe turns to bivalent Fe in a high temperature state are absorbed when cobalt oxidizes, the $O_2$ bubbles are reduced as a result, thereby obtaining the refining effect.

To evaluate press-formability of the glass, a glass containing coloring component (here, $Fe_2O_3$ and $Co_3O_4$) in the glass (Examples 1, 4 and 9) and a glass containing no coloring component (Examples 60, 61 and 62) were prepared, and Tg (glass transition point temperature) of the glasses was measured. Tg of the glass was 597° C. in Example 9 (working example), whereas it was 620° C. in Example 60 (comparative example, a glass omitting $Fe_2O_3$ and $Co_3O_4$ from Example 9). Further, it was 596° C. in Example 1 (working example), whereas it was 604° C. in Example 61 (comparative example, a glass omitting $Fe_2O_3$ and $Co_3O_4$ from Example 1). Further, it was 606° C. in Example 4 (working example), whereas it was 617° C. in Example 62 (comparative example, a glass omitting $Fe_2O_3$ and $Co_3O_4$ from Example 4).

From the above, the glasses of the working examples are capable of decreasing Tg of the glass by containing a predetermined content of coloring components in the glass and lowering the formation temperature of the glass during press formation. Thus, a glass excelling in press formability can be made, which is preferred for a glass for the purpose of being press formed into an appropriate shape such as a concave or convex shape, like a glass for housing for example.

When chemical strengthening is performed on the glass for chemical strengthening according to the embodiments, for example, it is carried out as follows. Specifically, these glasses are each immersed for six hours in a $KNO_3$ molten salt (100%) at approximately 425° C. to chemically strengthen it. When a potassium concentration analysis in a depth direction is performed on each glass, ion exchange occurs at the depth of 5 μm to 100 μm from the surface, and a compressive stress layer is generated.

Chemical strengthening was performed as follows on the glasses of Examples 1 to 60. Specifically, glasses were prepared in such a manner that 4 mm×4 mm surfaces of these glasses in a shape of 4 mm×4 mm×0.7 mm were mirror finished and other surfaces were #1000 finished. These glasses were each immersed for six hours in a $KNO_3$ molten salt (100%) at approximately 425° C. to chemically strengthen them. A potassium concentration analysis in a depth direction was performed using an EPMA on each glass after the chemical strengthening. Evaluation results are illustrated in Tables 1 to 7 as potassium ion diffusion depths (unit: μm). Note that estimated values are illustrated for Examples 12 to 14, 16 and Example 17 illustrated with "★".

As illustrated in the tables, in the glasses of Examples 1 to 17, sufficient potassium ion diffusion depths were obtained under the chemical strengthening condition, from which it is presumed that also the surface compressive stress layer depths of surface compressive stress layers are corresponding depths. As a result, it is conceivable that the glasses of the working examples can obtain a necessary and sufficient strength improving effect by the chemical strengthening.

Chemical strengthening was performed as follows on the glasses of Example 1, Example 27, Example 33, Examples 39 to 43, and Example 59. Specifically, glasses were prepared in such a manner that 4 mm×4 mm surfaces of these glasses in a shape of 4 mm×4 mm×0.7 mm were mirror finished and other surfaces were #1000 finished. These glasses were each immersed for six hours in a molten salt constituted of $KNO_3$ (99%) and $NaNO_3$ (1%) at approximately 425° C. to chemically strengthen them. Surface compressive stress (CS) and the depth of surface compressive stress layer (DOL) of each glass after the chemical strengthening were measured using a surface stress measurement apparatus. Evaluation results are illustrated in Table 9. Note that the surface stress measurement apparatus is an apparatus utilizing the fact that the surface compressive stress layer formed on a glass surface differs in refractive index from other glass portions in which the surface compressive stress layer does not exist, thereby exhibiting an optical waveguide effect. Further, in the surface stress measurement apparatus, an LED whose central wavelength is 795 nm was used as a light source to perform the measurement.

whereas the depth of the surface compressive stress layer of each glass of Example 1, Example 27, Example 33, and Examples 39 to 43 as working examples were 28 μm or more, which were larger than that of the soda lime glass. As a result, it is conceivable that the glasses of the working examples can obtain a necessary and sufficient strength improving effect by the chemical strengthening.

In order to confirm color change characteristics due to long term use of the glasses, the following evaluation test was performed. Samples obtained in such a manner that the glass samples of Example 1 and Example 58 were cut into 30 mm square plate shape and both surfaces thereof were optically polished to a predetermined thickness, were disposed at a position of 15 cm from a mercury lamp (H-400P) and irradiated with ultraviolet rays for 100 hours. The spectral transmittance of each sample before and after this light irradiation was measured using an ultraviolet, visible and near-infrared spectrophotometer (V-570 made by JASCO Corporation), and the absorption coefficient was calculated by using the above-described relational expression.

Then, variations of relative values of absorption coefficients i.e. ΔT (550/600) and ΔT (450/600) represented by following expressions (1) and (2) were calculated from the absorption coefficient of each sample before and after the light irradiation. Evaluation results are illustrated in Table 10.

$$\Delta T(550/600)(\%) = [\{A(550/600) - B(550/600)\}/A(550/600)] \times 100 \quad (1)$$

$$\Delta T(450/600)(\%) = [\{A(450/600) - B(450/600)\}/A(450/600)] \times 100 \quad (2)$$

(In the above expression (1), A(550/600) is a relative value of an absorption coefficient at a wavelength of 550 nm to an absorption coefficient at a wavelength of 600 nm, as calculated from a spectral transmittance curve of the glass after 100-hour irradiation with light of a 400 W high-pressure mercury lamp, and B(550/600) is a relative value of an absorption coefficient at a wavelength of 550 nm to an absorption coefficient at a wavelength of 600 nm, as calculated from a spectral transmittance curve of the glass before irradiation with the light. In the above expression (2), A(450/600) is a relative value of an absorption coefficient at a wavelength of 450 nm to an absorption coefficient at a wavelength of 600 nm, as calculated from a spectral transmittance curve of the

TABLE 9

|  | Example 1 | Example 27 | Example 33 | Example 39 | Example 40 | Example 41 | Example 42 | Example 43 | Example 59 |
|---|---|---|---|---|---|---|---|---|---|
| Surface compressive stress CS [MPa] | 885 | 794 | 784 | 853 | 817 | 797 | 767 | 774 | 607 |
| Depth of surface compressive stress layer DOL [μm] | 28 | 42 | 36 | 33 | 41 | 34 | 36 | 39 | 15 |

As illustrated in Table 9, in glasses of Example 1, Example 27, Example 33, and Examples 39 to 43, under the chemical strengthening condition, surface compressive stress as high as 767 MPa or more was obtained. Further, the depth of the surface compressive stress layer of the typical soda lime glass (Example 59) was approximately 15 μm as an example, glass after 100-hour irradiation with light of a 400 W high-pressure mercury lamp, and B(450/600) is a relative value of an absorption coefficient at a wavelength of 450 nm to an absorption coefficient at a wavelength of 600 nm, as calculated from a spectral transmittance curve of the glass before irradiation with the light.)

TABLE 10

|  | Example 1 Plate thickness: 0.714 mm | | Example 58 Plate thickness: 0.780 mm | |
| --- | --- | --- | --- | --- |
|  | Before light irradiation | After light irradiation | Before light irradiation | After light irradiation |
| (1) Absorption coefficient at wavelength of 600 nm | 5.347 | 5.375 | 1.100 | 1.108 |
| (2) Absorption coefficient at wavelength of 550 nm | 4.208 | 4.243 | 0.873 | 0.877 |
| (3) Absorption coefficient at wavelength of 450 nm | 4.138 | 4.117 | 1.007 | 1.014 |
| Relative value of absorption coefficient (@550 nm/@600 nm) *1 | 0.787 | 0.789 | 0.793 | 0.791 |
| Relative value of absorption coefficient (@450 nm/@60 nm) *2 | 0.774 | 0.766 | 0.916 | 0.915 |
| ΔT (550/600) [%] | 0.30 | | −0.30 | |
| ΔT (450/600) [%] | −1.04 | | −0.07 | |

*1: calculated from calculating expression of (2)/(1) based on absorption coefficient at each wavelength
*2: calculated from calculating expression of (3)/(1) based on absorption coefficient at each wavelength As illustrated in Table 10, in the glasses of Example 1 and Example 58, variations of relative values of absorption coefficients before and after the ultraviolet irradiation i.e. ΔT (550/600) and ΔT (450/600) are both 5% or less in absolute value, from which it can be seen that there will be no color change in glass due to long term use, and an initial appearance color can be maintained for a long period.

Further, the absorption coefficient at wavelengths of 380 nm to 780 nm was also obtained similarly to the above for the glasses after the chemical strengthening, and it was recognized that there was no change from the value before the chemical strengthening in either of them. It was also recognized that there was no change in color tone by visual observation. Thus, the glass for chemical strengthening according to the embodiments can be used for purposes that require strength by chemical strengthening without impairing a desired color tone. Therefore, the range of application can be extended to purposes which are required to have a decorating function.

In order to confirm radio wave transparency of the glasses, the following evaluation test was performed. First, glasses of Example 1 and Example 27 were cut out and processed to have a size 50 mm×50 mm×0.8 mm, and their main surface was polished to be in a mirror state. Then, each glass was measured for a dielectric loss tangent at frequencies of 50 MHz, 500 MHz, 900 MHz, 1.0 GHz by a volumetric method (parallel flat plate method) using an LCR meter and electrodes. Measurement results are illustrated in Table 11.

Note that the dielectric constants (∈) of the glasses at the frequency of 50 MHz were 7.6.

TABLE 11

| Frequency | Example 1 tan δ | Example 27 tan δ |
| --- | --- | --- |
| 50 MHz | 0.007 | 0.006 |
| 500 MHz | 0.007 | 0.006 |
| 900 MHz | 0.007 | 0.005 |
| 1.0 GHz | 0.007 | 0.004 |

As illustrated in Table 11, in these glasses the dielectric loss tangent at frequencies in the range of 50 MHz to 1.0 GHz is less than 0.01, and it can be seen that they have favorable radio wave transparency.

According to the present invention, a glass having excellent bubble quality can be obtained stably while lowering its environmental load. Further, a glass for chemical strengthening preferred for refining with sulfate can be obtained. The glass of the present invention is also able to be chemical strengthened, and can be used preferably for purposes that require a small thickness and high strength, for example, decorative purposes. Further, in the glass for chemical strengthening of the present invention, breakage due to a crack does not easily occur, and hence a glass having high strength can be made. The glass of the present invention also excels in press formability, and can be processed in a desired shape required for housing purposes or the like at low cost.

The glass of the present invention can be used for decorations of an operating panel of an audiovisual apparatus, office automation apparatus, or the like, an opening/closing door, an operating button/knob of the same product, or the like, or a decorative panel disposed around a rectangular display surface of an image display panel of a digital photo frame, TV, or the like, and for a glass housing for an electronic device, and the like. It can also be used for an automobile interior member, a member of furniture or the like, a building material used outdoors or indoors, or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A glass for chemical strengthening comprising, in mole percentage based on following oxides, 55% to 80% of $SiO_2$, 3% to 16% of $Al_2O_3$, 0% to 12% of $B_2O_3$, 5% to 16% of $Na_2O$, 0% to 4% of $K_2O$, 0% to 15% of MgO, 0% to 3% of CaO, 0% to 18% of ΣRO (where R represents Mg, Ca, Sr, Ba or Zn), 0% to 1% of $ZrO_2$, 0.005% to 0.5% of $SO_3$, and 0.1% to 7% of a coloring component having at least one metal oxide selected from the group consisting of oxides of Co, Mn, Fe, Ni, Cu, Cr, V and Bi.

2. The glass for chemical strengthening according to claim 1,
wherein the coloring component in the glass is constituted of, in mole percentage based on oxides, 0.01% to 6% of $Fe_2O_3$, 0% to 6% of $Co_3O_4$, 0% to 6% of NiO, 0% to 6% of MnO, 0% to 6% of $Cr_2O_3$, and 0% to 6% of $V_2O_5$.

3. The glass for chemical strengthening according to claim 1, comprising 0.005% to 2% of a color correcting component having at least one metal oxide selected from the group consisting of oxides of Ti, Ce, Er, Nd and Se.

4. A glass for chemical strengthening comprising, in mole percentage based on following oxides, 60% to 80% of $SiO_2$, 3% to 15% of $Al_2O_3$, 5% to 15% of $Na_2O$, 0% to 4% of $K_2O$, 0% to 15% of MgO, 0% to 3% of CaO, 0% to 18% of ΣRO (where R represents Mg, Ca, Sr, Ba or Zn), 0% to 1% of $ZrO_2$, 1.5% to 6% of $Fe_2O_3$, and 0.1% to 1% of $Co_3O_4$.

5. A glass for chemical strengthening comprising, in mole percentage based on following oxides, 55% to 75% of $SiO_2$, 8% to 16% of $Al_2O_3$, 4% to 12% of $B_2O_3$, 7% to 16% of $Na_2O$, 0% to 4% of $K_2O$, 0% to 3% of MgO, 0% to 3% of CaO, 0% to 5% of ERO (where R represents Mg, Ca, Sr, Ba or Zn), 0% to 1% of $ZrO_2$, 1.5% to 6% of $Fe_2O_3$, and 0.1% to 1% of $Co_3O_4$.

6. The glass for chemical strengthening according to claim 1,
wherein the coloring component in the glass comprises $Co_3O_4$ and $Fe_2O_3$ in a mole ratio $Co_3O_4/Fe_2O_3$ ranging from 0.01 to 0.5.

7. The glass for chemical strengthening according to claim 1,
wherein
the coloring component in the glass comprises $Co_3O_4$ and $Fe_2O_3$,
the glass may further comprise 0% to 15% $Li_2O$, and
a mole ratio $(SiO_2+Al_2O_3+B_2O_3)/(\Sigma R'_2O$ (where R' represents Na, K or Li)$+CaO+SrO+BaO+Fe_2O_3+Co_3O_4)$ is three or more.

8. The glass for chemical strengthening according to claim 1, comprising 0.005% to 1% of $SnO_2$.

9. The glass for chemical strengthening according to claim 1,
wherein a minimum value of an absorption coefficient at wavelengths of 380 nm to 780 nm is 1 $mm^{-1}$ or more.

10. The glass for chemical strengthening according to claim 1,
wherein a relative value of an absorption coefficient at a wavelength of 550 nm to an absorption coefficient at a wavelength of 600 nm, as calculated from a spectral transmittance curve of the glass and a relative value of an absorption coefficient at a wavelength of 450 nm to an absorption coefficient at a wavelength of 600 nm, as calculated from a spectral transmittance curve of the glass are both within a range of 0.7 to 1.2.

11. The glass for chemical strengthening according to claim 1,
wherein absolute values of variations ΔT (550/600) and ΔT (450/600) calculated from relative values of the absorption coefficients as expressed by the following expressions (1) and (2) are 5% or less:

$$\Delta T(550/600)(\%) = [\{A(550/600) - B(550/600)\}/A(550/600)] \times 100 \quad (1); \text{ and}$$

$$\Delta T(450/600)(\%) = [\{A(450/600) - B(450/600)\}/A(450/600)] \times 100 \quad (2)$$

where in the above expression (1), A(550/600) is a relative value of an absorption coefficient at a wavelength of 550 nm to an absorption coefficient at a wavelength of 600 nm, as calculated from a spectral transmittance curve of the glass after 100-hour irradiation with light of a 400 W high-pressure mercury lamp, and B(550/600) is a relative value of an absorption coefficient at a wavelength of 550 nm to an absorption coefficient at a wavelength of 600 nm, as calculated from a spectral transmittance curve of the glass before irradiation with the light; in the above expression (2), A(450/600) is a relative value of an absorption coefficient at a wavelength of 450 nm to an absorption coefficient at a wavelength of 600 nm, as calculated from a spectral transmittance curve of the glass after 100-hour irradiation with light of a 400 W high-pressure mercury lamp, and B(450/600) is a relative value of an absorption coefficient at a wavelength of 450 nm to an absorption coefficient at a wavelength of 600 nm, as calculated from a spectral transmittance curve of the glass before irradiation with the light.

12. The glass for chemical strengthening according to claim 1,
wherein when an indentation is formed by using a Vickers indenter in a mirror-finished surface of a glass plate having a thickness of 1 mm made of the glass for chemical strengthening, a load of the Vickers indenter that causes a crack occurrence rate to be 50% is 150 gf or more.

13. A chemical strengthened glass obtained by chemical strengthening a glass for chemical strengthening comprising, in mole percentage based on following oxides, 55% to 80% of $SiO_2$, 3% to 16% of $Al_2O_3$ 0% to 12% of $B_7O_3$, 5% to 16% of $Na_2O$, 0% to 4% of $K_2O$, 0% to 15% of MgO, 0% to 3% of CaO, 0% to 18% of ΣRO (where R represents Mg, Ca, Sr, Ba or Zn), 0% to 1% of $ZrO_2$, and 0.1% to 7% of a coloring component having at least one metal oxide selected from the group consisting of oxides of Co, Mn, Fe, Ni, Cu, Cr, V and Bi,
wherein a depth of a surface compressive stress layer formed in a surface of the chemical strengthened glass by the chemical strengthening is 30 μm or more, and a surface compressive stress of the surface compressive stress layer is 550 MPa or more.

14. The chemical strengthened glass according to claim 13, wherein said glass for chemical strengthening further comprises 0.005% to 0.5% of $SO_3$.

15. The chemical strengthened glass according to claim 13, wherein said glass for chemical strengthening further comprises 0.005% to 1% of $SnO_2$.

16. A glass for chemical strengthening comprising, in mole percentage based on following oxides, 55% to 80% of $SiO_2$, 3% to 16% of $Al_2O_3$, 0% to 12% of $B_2O_3$, 5% to 16% of $Na_2O$, 0% to 4% of $K_2O$, 0% to 15% of MgO, 0% to 3% of CaO, 0% to 18% of ΣRO (where R represents Mg, Ca, Sr, Ba or Zn), 0% to 1% of $ZrO_2$, 0.005% to 1% of $SnO_2$, and 0.1% to 7% of a coloring component having at least one metal oxide selected from the group consisting of oxides of Co, Mn, Fe, Ni, Cu, Cr, V and Bi.

17. The glass for chemical strengthening according to claim 16,
wherein the coloring component in the glass is constituted of, in mole percentage based on oxides, 0.01% to 6% of $Fe_2O_3$, 0% to 6% of $Co_3O_4$, 0% to 6% of NiO, 0% to 6% of MnO, 0% to 6% of $Cr_2O_3$, and 0% to 6% of $V_2O_5$.

18. The glass for chemical strengthening according to claim 16, comprising 0.005% to 2% of a color correcting component having at least one metal oxide selected from the group consisting of oxides of Ti, Ce, Er, Nd and Se.

19. The glass for chemical strengthening according to claim 16,
wherein the coloring component in the glass comprises $Co_3O_4$ and $Fe_2O_3$ in a mole ratio $Co_3O_4/Fe_2O_3$ ranging from 0.01 to 0.5.

20. The glass for chemical strengthening according to claim 16, wherein the coloring component in the glass comprises $Co_3O_4$ and $Fe_2O_3$, the glass may further comprise 0% to 15% $Li_2O$, and a mole ratio $(SiO_2+Al_2O_3+B_2O_3)/(\Sigma R'_2O$ (where R' represents Na, K or Li)$+CaO+SrO+BaO+Fe_2O_3+Co_3O_4)$ is three or more.

21. The glass for chemical strengthening according to claim 16, wherein a minimum value of an absorption coefficient at wavelengths of 380 nm to 780 nm is 1 $mm^{-1}$ or more.

22. The glass for chemical strengthening according to claim 16, wherein a relative value of an absorption coefficient at a wavelength of 550 nm to an absorption coefficient at a wavelength of 600 nm, as calculated from a spectral transmittance curve of the glass and a relative value of an absorption coefficient at a wavelength of 450 nm to an absorption coefficient at a wavelength of 600 nm, as calculated from a spectral transmittance curve of the glass are both within a range of 0.7 to 1.2.

23. The glass for chemical strengthening according to claim 16, wherein absolute values of variations ΔT (550/600) and ΔT (450/600) calculated from relative values of the absorption coefficients as expressed by the following expressions (1) and (2) are 5% or less:

$$\Delta T(550/600)(\%)=[\{A(550/600)-B(550/600)\}/A(550/600)]\times 100 \quad (1); \text{ and}$$

$$\Delta T(450/600)(\%)=[\{A(450/600)-B(450/600)\}/A(450/600)]\times 100 \quad (2)$$

where in the above expression (1), A(550/600) is a relative value of an absorption coefficient at a wavelength of 550 nm to an absorption coefficient at a wavelength of 600 nm, as calculated from a spectral transmittance curve of the glass after 100-hour irradiation with light of a 400 W high-pressure mercury lamp, and B(550/600) is a relative value of an absorption coefficient at a wavelength of 550 nm to an absorption coefficient at a wavelength of 600 nm, as calculated from a spectral transmittance curve of the glass before irradiation with the light; in the above expression (2), A(450/600) is a relative value of an absorption coefficient at a wavelength of 450 nm to an absorption coefficient at a wavelength of 600 nm, as calculated from a spectral transmittance curve of the glass after 100-hour irradiation with light of a 400 W high-pressure mercury lamp, and B(450/600) is a relative value of an absorption coefficient at a wavelength of 450 nm to an absorption coefficient at a wavelength of 600 nm, as calculated from a spectral transmittance curve of the glass before irradiation with the light.

24. The glass for chemical strengthening according to claim 16, wherein when an indentation is formed by using a Vickers indenter in a mirror-finished surface of a glass plate having a thickness of 1 mm made of the glass for chemical strengthening, a load of the Vickers indenter that causes a crack occurrence rate to be 50% is 150 gf or more.

* * * * *